(12) United States Patent
Peng et al.

(10) Patent No.: US 11,044,724 B2
(45) Date of Patent: Jun. 22, 2021

(54) COMMUNICATION METHOD, NETWORK SIDE DEVICE, AND TERMINAL DEVICE

(71) Applicant: HUAWEI TECHNOLOGIES CO., LTD, Shenzhen (CN)

(72) Inventors: Jinlin Peng, Shanghai (CN); Pengpeng Dong, Shanghai (CN); Longbao Wang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 16/504,189

(22) Filed: Jul. 5, 2019

(65) Prior Publication Data

US 2019/0335457 A1 Oct. 31, 2019

Related U.S. Application Data

(63) Continuation of application No. PCT/CN2017/118918, filed on Dec. 27, 2017.

(30) Foreign Application Priority Data

Jan. 5, 2017 (CN) .......................... 201710007992.4

(51) Int. Cl.
*H04W 28/02* (2009.01)
*H04W 72/04* (2009.01)
*H04L 5/00* (2006.01)

(52) U.S. Cl.
CPC ....... *H04W 72/0446* (2013.01); *H04L 5/0053* (2013.01); *H04W 72/042* (2013.01); *H04W 72/046* (2013.01)

(58) Field of Classification Search
CPC . H04L 1/16; H04L 1/1607; H04L 1/18; H04L 1/1812; H04L 5/0053;
(Continued)

(56) References Cited

U.S. PATENT DOCUMENTS 7,853,853 B2 12/2010 Demirhan et al.
8,971,275 B2 * 3/2015 Dinan .................. H04L 1/0026
370/329
(Continued)

FOREIGN PATENT DOCUMENTS

CN 102685914 A 9/2012
CN 103580822 A 2/2014
(Continued)

OTHER PUBLICATIONS

LG Electronics, Discussions on uplink design for NB-IoT. 3GPP TSG RAN WG1 Meeting #83 Anaheim, USA, Nov. 15-22, 2015, R1-156884, 5 pages.
(Continued)

*Primary Examiner* — Frank Duong
(74) *Attorney, Agent, or Firm* — Hauptman Ham, LLP

(57) ABSTRACT

Embodiments provide a communication method, a network side device, and a terminal device. When a quantity of minimum scheduling time units in one time of scheduling performed by a network side device is S, and the network side device and a terminal device transmit data in a first transmission mode, a target scheduling rule can be determined by the terminal device from N scheduling rules. The scheduling rule includes at least one of a quantity T of transport blocks in one time of scheduling and a mapping relationship between T transport blocks and S minimum scheduling time units in one time of scheduling. The first transmission mode is a single-antenna transmission scheme or a multi-antenna transmission scheme. Communication can be performed, by the network side device, with the terminal device according to the target scheduling rule. In this way, proper scheduling rules can be selected to adapt to different scenarios.

17 Claims, 9 Drawing Sheets

(58) Field of Classification Search
CPC .. H04L 5/0082; H04W 72/04; H04W 72/042; H04W 72/0446; H04W 72/0453; H04W 72/046; H04W 72/12; H04W 72/1205; H04W 72/1226; H04W 72/1263; H04W 72/1268; H04W 72/1273; H04W 72/1284; H04W 72/1289; H04W 72/1294
See application file for complete search history.

(56) References Cited

U.S. PATENT DOCUMENTS

| | | | |
|---|---|---|---|
| 9,521,661 | B1 | 12/2016 | Zhou et al. |
| 10,367,677 | B2 * | 7/2019 | Parkvall ............... H04B 7/0617 |
| 2005/0143084 | A1 | 6/2005 | Cheng et al. |
| 2014/0119334 | A1 | 5/2014 | Kazmi et al. |
| 2016/0081063 | A1 | 3/2016 | Chen et al. |

FOREIGN PATENT DOCUMENTS

| | | |
|---|---|---|
| CN | 104144029 A | 11/2014 |
| CN | 104885398 A | 9/2015 |
| CN | 105517053 A | 4/2016 |
| CN | 105792359 A | 7/2016 |
| EP | 1569403 A2 | 8/2005 |
| EP | 2077056 B1 | 3/2016 |
| WO | 2016185444 A1 | 11/2016 |

OTHER PUBLICATIONS

R2-162429 Huawei, HiSilicon,"Considerations on Qos control and UL transmission on LAA SCell",3GPP TSG-RAN WG2 Meeting #93bis,Dubrovnik, Croatia Apr. 11-15, 2016,total 5 pages.

* cited by examiner

COMMUNICATION METHOD, NETWORK SIDE DEVICE, AND TERMINAL DEVICE

CROSS-REFERENCE TO RELATED APPLICATIONS

This application is a continuation of International Application No. PCT/CN2017/118918, filed on Dec. 27, 2017, which claims priority to Chinese Patent Application No. 201710007992.4, filed on Jan. 5, 2017. The disclosures of the aforementioned applications are hereby incorporated by reference in their entireties.

TECHNICAL FIELD

Embodiments of this application relate to the field of communications technologies, and more specifically, to a communication method, a network side device, and a terminal device.

BACKGROUND

In the Long Term Evolution (long term evolution, LTE) protocol, data sent from a medium access control (medium access control, MAC) layer to a physical layer is organized in a transport block (transport block, TB) form. One transport block corresponds to a data block that includes one MAC protocol data unit (protocol data unit, PDU), and the data block is sent within one transmission time interval (transmission time interval, TTI). A hybrid automatic repeat request (hybrid automatic repeat request, HARQ) is retransmitted every TTI. Only one transport block is processed in each HARQ process within one TTI.

A mapping relationship between a transport block and a minimum scheduling unit specified in a current protocol is not applicable to all scenarios. Therefore, a scheduling solution is required to enable the mapping relationship between the transport block and the minimum scheduling unit to be flexibly applied to various scenarios.

SUMMARY

Embodiments of this application provide a communication method, a network side device, and a terminal device, so that proper scheduling rules can be selected to adapt to different scenarios.

According to a first aspect, an embodiment of this application provides a communication method, and the method includes: when a quantity of minimum scheduling time units in one time of scheduling performed by a network side device is S, and the network side device and a terminal device transmit data in a first transmission mode, determining, by the network side device, a target scheduling rule from N scheduling rules, where the scheduling rule includes at least one of a quantity T of transport blocks in one time of scheduling and a mapping relationship between T transport blocks and S minimum scheduling time units in one time of scheduling, N is an integer greater than or equal to 2, T is an integer greater than or equal to 1, S is an integer greater than or equal to 1, and the first transmission mode is a single-antenna transmission scheme or a multi-antenna transmission scheme; and communicating, by the network side device, with the terminal device according to the target scheduling rule. In the foregoing technical solution, proper scheduling rules can be selected to adapt to different scenarios. In addition, each minimum scheduling time unit may further carry a plurality of transport blocks in frequency domain. According to the foregoing technical solution, a requirement of a transport block for flexible resource reuse can be further met. For example, using fewer resources in retransmission usually can avoid resource waste and improve spectral efficiency, or using more resources in retransmission can ensure a latency and reliability.

With reference to the first aspect, in a first possible implementation of the first aspect, the determining, by the network side device, a target scheduling rule from N scheduling rules includes: determining, by the network side device based on a correspondence between parameter information and a scheduling rule, a scheduling rule corresponding to determined parameter information in the N scheduling rules as the target scheduling rule, where the parameter information includes at least one of a subcarrier spacing used when the network side device communicates with the terminal device and a quantity of symbols occupied by a minimum scheduling time unit that are used when the network side device communicates with the communications device. According to the foregoing technical solution, the target scheduling rule determined by the network side device corresponds to parameter information used when the network side device communicates with the terminal device, so that the scheduling rule better adapts to a network environment in which the terminal device is located.

With reference to the first aspect, in a second possible implementation of the first aspect, the network side device determines radio resource information, and the network side device determines, based on a correspondence between radio resource information and a scheduling rule, a scheduling rule corresponding to the determined radio resource information in the N scheduling rules as the target scheduling rule. According to the foregoing technical solution, the target scheduling rule determined by the network side device corresponds to current radio resource information, so that the scheduling rule better adapts to a current radio resource utilization situation.

With reference to the first aspect, in a third possible implementation of the first aspect, the network side device determines a working status of the terminal device, and the network side device determines, based on a correspondence between a working status of the terminal device and a scheduling rule, a scheduling rule corresponding to the determined working status of the terminal device in the N scheduling rules as the target scheduling rule. According to the foregoing technical solution, the target scheduling rule determined by the network side device corresponds to the working status of the terminal device, so that the scheduling rule better adapts to the working status of the terminal device.

With reference to the first aspect, in a fourth possible implementation of the first aspect, the network side device determines radio environment information, and the network side device determines, based on a correspondence between radio environment information and a scheduling rule, a scheduling rule corresponding to the determined radio environment information in the N scheduling rules as the target scheduling rule. According to the foregoing technical solution, the target scheduling rule determined by the network side device corresponds to a radio environment, so that the scheduling rule better adapts to a current radio environment.

With reference to any one of the first aspect or the possible implementations of the first aspect, in a fifth possible implementation of the first aspect, the mapping relationship between T transport blocks and S minimum scheduling time units in one time of scheduling is: each of the T transport blocks is mapped to one of the S minimum scheduling time units; each of the T transport blocks is mapped to the S minimum scheduling time units; or each of the T transport blocks is mapped to $S_t$ consecutive minimum scheduling time units in the S minimum scheduling time units, where $S=S_t \times T$, and $S_t$ is an integer greater than 1 and less than S. In the foregoing technical solution, a mapping relationship between a transport block and a minimum scheduling unit is determined according to a specific rule. The network side device and the terminal device may store or predefine the rule. In this case, the scheduling rule may include only a quantity of transport blocks in one time of scheduling, and a corresponding quantity of minimum scheduling units to which one transport block is mapped may be obtained according to the foregoing rule, or the scheduling rule may include only a quantity of minimum scheduling units to which one transport block is mapped, and a corresponding quantity of transport blocks in one time of scheduling may be obtained according to the foregoing rule.

With reference to any one of the first aspect or the foregoing possible implementations of the first aspect, in a sixth possible implementation of the first aspect, the mapping relationship between T transport blocks and S minimum scheduling time units in one time of scheduling is: a first transport block in the T transport blocks is mapped to a+b minimum scheduling time units, and each of the T transport blocks except the first transport block is mapped to a minimum scheduling time units, where both a and b are positive integers, b is less than T, and $S=a \times T+b$; or a $T^{th}$ transport block in the T transport blocks is mapped to a+b minimum scheduling time units, and each of the T transport blocks except the $T^{th}$ transport block is mapped to a minimum scheduling time units, where both a and b are positive integers, b is less than T, and $S=a \times T+b$. In the foregoing technical solution, a mapping relationship between a transport block and a minimum scheduling unit is determined according to a specific rule. The network side device and the terminal device may store or predefine the rule. In this case, the scheduling rule may include only a quantity of transport blocks in one time of scheduling, and a corresponding quantity of minimum scheduling units to which one transport block is mapped may be obtained according to the foregoing rule, or the scheduling rule may include only a quantity of minimum scheduling units to which one transport block is mapped, and a corresponding quantity of transport blocks in one time of scheduling may be obtained according to the foregoing rule.

With reference to any one of the first aspect or the foregoing possible implementations of the first aspect, in a seventh possible implementation of the first aspect, before the communicating, by the network side device, with the terminal device according to the target scheduling rule, the method further includes: sending, by the network side device, target scheduling rule indication information to the terminal device, where the target scheduling rule indication information is used to indicate the target scheduling rule determined by the network side device. In this way, the network side device may indicate the determined target scheduling rule to the terminal device, so that the terminal device determines a scheduling rule that needs to be used.

With reference to the seventh possible implementation of the first aspect, in an eighth possible implementation of the first aspect, the target scheduling rule indication information includes at least one of the following: a subcarrier spacing, a quantity of symbols occupied by a minimum scheduling time unit, a downlink control information format, a modulation and coding scheme, a cyclic redundancy check code, and a quantity of allocated resource blocks. According to the foregoing technical solution, the network side device may implicitly indicate the target scheduling rule to the terminal device, and therefore no field indication needs to be newly introduced, or content carried in an indication field specified in an existing rule does not need to change.

With reference to the seventh possible implementation of the first aspect, in a ninth possible implementation of the first aspect, the target scheduling rule indication information is carried in control signaling. According to the foregoing technical solution, the network side device may explicitly indicate the target scheduling rule to the terminal device, so that a scheduling rule that needs to be used can be more explicitly indicated to the terminal device.

According to a second aspect, an embodiment of this application provides a communication method, and the method includes: when a terminal device and a network side device transmit data in a first transmission mode, and a quantity of minimum scheduling time units in one time of scheduling performed by the network side device is S, determining, by the terminal device, a target scheduling rule, where the target scheduling rule is one of N scheduling rules, the scheduling rule includes at least one of a quantity T of transport blocks in one time of scheduling and a mapping relationship between T transport blocks and S minimum scheduling time units in one time of scheduling, N is a positive integer greater than or equal to 2, T is a positive integer greater than or equal to 1, S is a positive integer greater than or equal to 1, and the first transmission mode is a single-antenna transmission scheme or a multi-antenna transmission scheme; and communicating, by the terminal device, with the network side device according to the target scheduling rule. In the foregoing technical solution, proper scheduling rules can be selected to adapt to different scenarios. In addition, each minimum scheduling time unit may further carry a plurality of transport blocks in frequency domain. According to the foregoing technical solution, a requirement of a transport block for flexible resource reuse can be further met. For example, using fewer resources in retransmission usually can avoid resource waste and improve spectral efficiency, or using more resources in retransmission can ensure a latency and reliability.

With reference to the second aspect, in a first possible implementation of the second aspect, the determining, by the terminal device, a target scheduling rule includes: determining, by the terminal device, that the target scheduling rule is a scheduling rule corresponding to parameter information used when the terminal device communicates with the network side device, where the parameter information includes at least one of a subcarrier spacing used when the network side device communicates with the terminal device and a quantity of symbols occupied by each minimum scheduling time unit. According to the foregoing technical solution, the target scheduling rule determined by the network side device corresponds to parameter information used when the network side device communicates with the terminal device, so that the scheduling rule better adapts to a network environment in which the terminal device is located.

With reference to the second aspect or the first possible implementation of the second aspect, in a second possible implementation of the second aspect, the determining, by the terminal device, a target scheduling rule includes: obtaining, by the terminal device, target scheduling rule indication information sent by the network side device, where the target scheduling rule indication information is used to indicate a scheduling rule determined by the network side device; and determining, by the terminal device, the target scheduling rule as the scheduling rule indicated by the target scheduling rule indication information. According to the foregoing technical solution, the terminal device may determine, according to an indication of the network side device, a scheduling rule used when the terminal device communicates with the network side device, so that a proper scheduling rule can be used to communicate with the network side device.

With reference to the second possible implementation of the second aspect, in a third possible implementation of the second aspect, the target scheduling rule indication information includes at least one of the following: a subcarrier spacing, a quantity of symbols occupied by a minimum scheduling time unit, a downlink control information format, a modulation and coding scheme, a cyclic redundancy check code, and a quantity of allocated resource blocks. According to the foregoing technical solution, the network side device may implicitly indicate the target scheduling rule to the terminal device, and therefore content carried in an indication field specified in an existing rule does not need to change.

With reference to the third possible implementation of the second aspect, in a fourth possible implementation of the second aspect, the determining, by the terminal device, the target scheduling rule as the scheduling rule indicated by the target scheduling rule indication information includes: determining, by the terminal device based on a correspondence between target scheduling rule indication information and a scheduling rule, the scheduling rule corresponding to the target scheduling rule indication information in the N scheduling rules as the target scheduling rule. According to the foregoing technical solution, the network side device may implicitly indicate the target scheduling rule to the terminal device, and therefore content carried in an indication field specified in an existing rule does not need to change.

With reference to the second possible implementation of the second aspect, in a fifth possible implementation of the second aspect, the obtaining, by the terminal device, target scheduling rule indication information sent by the network side device includes: obtaining, by the terminal device, the target scheduling rule indication information from received control signaling sent by the network side device. According to the foregoing technical solution, the network side device may explicitly indicate the target scheduling rule to the terminal device, so that a scheduling rule that needs to be used can be more explicitly indicated to the terminal device.

With reference to any one of the second aspect or the possible implementations of the second aspect, in a sixth possible implementation of the second aspect, the mapping relationship between T transport blocks and S minimum scheduling time units in one time of scheduling is: each of the T transport blocks is mapped to one of the S minimum scheduling time units; each of the T transport blocks is mapped to the S minimum scheduling time units; or each of the T transport blocks is mapped to $S_t$ consecutive minimum scheduling time units in the S minimum scheduling time units, where $S=S_t \times T$, and $S_t$ is an integer greater than 1 and less than S. In the foregoing technical solution, a mapping relationship between a transport block and a minimum scheduling unit is determined according to a specific rule. The network side device and the terminal device may store or predefine the rule. In this case, the scheduling rule may include only a quantity of transport blocks in one time of scheduling, and a corresponding quantity of minimum scheduling units to which one transport block is mapped may be obtained according to the foregoing rule, or the scheduling rule may include only a quantity of minimum scheduling units to which one transport block is mapped, and a corresponding quantity of transport blocks in one time of scheduling may be obtained according to the foregoing rule.

With reference to any one of the second aspect or the foregoing possible implementations of the second aspect, in a seventh possible implementation of the second aspect, the mapping relationship between T transport blocks and S minimum scheduling time units in one time of scheduling is: a first transport block in the T transport blocks is mapped to a+b minimum scheduling time units, and each of the T transport blocks except the first transport block is mapped to a minimum scheduling time units, where both a and b are positive integers, b is less than T, and $S=a \times T+b$; or a $T^{th}$ transport block in the T transport blocks is mapped to a+b minimum scheduling time units, and each of the T transport blocks except the $T^{th}$ transport block is mapped to a minimum scheduling time units, where both a and b are positive integers, b is less than T, and $S=a \times T+b$. In the foregoing technical solution, a mapping relationship between a transport block and a minimum scheduling unit is determined according to a specific rule. The network side device and the terminal device may store or predefine the rule. In this case, the scheduling rule may include only a quantity of transport blocks in one time of scheduling, and a corresponding quantity of minimum scheduling units to which one transport block is mapped may be obtained according to the foregoing rule, or the scheduling rule may include only a quantity of minimum scheduling units to which one transport block is mapped, and a corresponding quantity of transport blocks in one time of scheduling may be obtained according to the foregoing rule.

According to a third aspect, an embodiment of this application provides a network side device, and the network side device includes units for performing any one of the first aspect or the possible implementations of the first aspect.

According to a fourth aspect, an embodiment of this application provides a terminal device, and the terminal device includes units for performing any one of the second aspect or the possible implementations of the second aspect.

According to a fifth aspect, an embodiment of this application provides a network side device. The network side device includes a processor, a memory, and a transceiver. The memory is configured to store an instruction for implementing the method in any one of the first aspect or the possible implementations of the first aspect. The processor executes the instruction stored in the memory, and implements, in combination with a communications interface, the method in any one of the first aspect or the possible implementations of the first aspect.

According to a sixth aspect, an embodiment of this application provides a terminal device. The terminal device includes a processor, a memory, and a transceiver. The memory is configured to store an instruction for implementing the method in any one of the second aspect or the possible implementations of the second aspect. The processor executes the instruction stored in the memory, and implements, in combination with a communications interface, the method in any one of the second aspect or the possible implementations of the second aspect.

DESCRIPTION OF EMBODIMENTS

Figure 1:
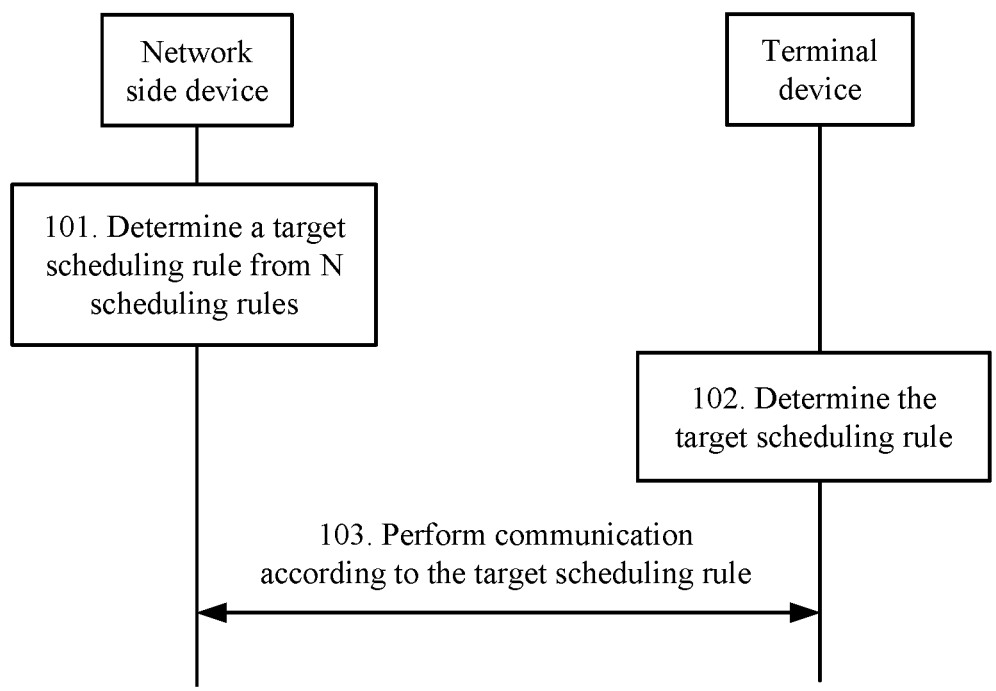
FIG. 1 is a schematic flowchart of a communication method according to an embodiment of this application.

The following describes the technical solutions in various embodiments with reference to the accompanying drawings.

It should be understood that the technical solutions in various embodiments may be applied to various communications systems, such as a Long Term Evolution (long term evolution, LTE) system, an LTE frequency division duplex (frequency division duplex, FDD) system, an LTE time division duplex (time division duplex, TDD) system, a 4.5th generation (4.5$^{th}$ generation, 4.5G) network, a 5th generation (5$^{th}$ generation, 5G) network, and new radio (new radio, NR).

A terminal device in the technical solutions in various embodiments o may also be referred to as an access terminal, user equipment (user equipment, UE), a subscriber unit, a subscriber station, a mobile station, a mobile console, a remote station, a remote terminal, a mobile device, a user terminal, a terminal, a wireless communications device, a user agent or a user apparatus, a handheld device having a wireless communication function, a computing device or another processing device connected to a wireless modem, an in-vehicle device, a wearable device, or a terminal device in a future 5G network. The terminal device may communicate with one or more core networks by using a radio access network (radio access network, RAN), or may access a distributed network in a self-organizing or grant-free manner. The terminal device may further access a wireless network in another manner for communication, or the terminal device may directly perform wireless communication with another terminal device. This is not limited in the embodiments of this application.

A network side device may be a NodeB (node B), an evolved NodeB (evolutional node B, eNB), a base station in a communications system, a base station in a future communications system, a network device, or the like.

A data transmission method provided in various embodiments may be applied to downlink data transmission, or may be applied to uplink data transmission, or may be applied to device-to-device (device to device, D2D) data transmission. For the downlink data transmission, a sending device is a network side device, and a corresponding receiving device is a terminal device. For the uplink data transmission, a sending device is a terminal device, and a corresponding receiving device is a network side device. For the D2D data transmission, a sending device is a terminal device, and a corresponding receiving device is also a terminal device. This is not limited in the embodiments of this application.

The sending device and the receiving device in various embodiments o may be deployed on land and includes an indoor or outdoor device, a handheld device, or an in-vehicle device, or may be deployed on the water, or may be deployed on an airplane, a balloon, or a satellite in the air. The terminal device in the embodiments of this application may be a mobile phone (mobile phone), a tablet computer (Pad), a computer with a wireless sending/receiving function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application.

FIG. 1 is a schematic flowchart of a communication method according to an embodiment of this application.

101. When a quantity of minimum scheduling time units in one time of scheduling performed by a network side device is S, and the network side device and a terminal device transmit data in a first transmission mode, the network side device determines a target scheduling rule from N scheduling rules, where the scheduling rule includes at least one of a quantity T of transport blocks in one time of scheduling and a mapping relationship between T transport blocks and S minimum scheduling time units in one time of scheduling, N is a positive integer greater than or equal to 2, T is a positive integer greater than or equal to 1, S is a positive integer greater than or equal to 1, and the first transmission mode is a single-antenna transmission scheme or a multi-antenna transmission scheme.

The multi-antenna transmission scheme may be a transmit diversity transmission scheme, a spatial multiplexing transmission scheme, a multi-user multiple-input multiple-output (multiple-input multiple-output, MIMO) transmission scheme, a coordinated multipoint transmission/reception (coordinated multiple points transmission/reception, CoMP) scheme, a beamforming transmission scheme, or the like, or may be various antenna port, layer, stream, or rank configurations. The first transmission mode is a transmission mode determined by the network side device. The first transmission mode may be any one of transmission modes (transmission mode, TM) 1 to 10 defined in an LTE system, or may be another transmission mode (for example, 5G). This is not limited in this embodiment. The single-antenna transmission scheme or a non-spatial multiplexing transmission scheme is used as an example in the following embodiment, and the multi-antenna transmission scheme or the spatial multiplexing transmission scheme may be obtained in a similar manner.

The transport block herein may be a transport block (transport block, TB) in the LTE protocol, or may be a transmission unit having a same function in another communications system (for example, 5G).

The minimum scheduling time unit herein may be a transmission time interval (transmission time interval, TTI), a slot (slot), a time domain symbol, or a mini-slot (mini slot) including one or more time domain symbols. The time domain symbol may be an orthogonal frequency division multiplexing (orthogonal frequency division multiplexing, OFDM) symbol, or may be a single carrier frequency division multiple access (single carrier frequency division multiple access, SC-FDMA) symbol. The time domain symbol is referred to as a symbol below.

102. The terminal device determines the target scheduling rule.

103. The network side device communicates with the terminal device according to the target scheduling rule. The communication herein may be uplink communication or downlink communication.

Usually, one transport block requires a plurality of bits of control information, for example, a new data indicator (new data indicator, NDI), a redundancy version (redundancy version, RV), and a hybrid automatic repeat request (hybrid automatic repeat request, HARQ) feedback information indication. Therefore, a smaller quantity of transport blocks indicates fewer bits of required control information and lower corresponding overheads of the control information. In addition, when one transport block is mapped to more minimum scheduling time units, a transmission time interval (transmission time interval, TTI) of one transport block is longer, thereby extending an uplink coverage area of the terminal device. In some embodiments, when one transport block is mapped to a plurality of minimum scheduling time units, a transport block size (transport block size, TBS) may be larger. In other words, the TBS may be in direct proportion to data of a minimum scheduling time unit. A higher coding gain may be obtained based on a larger TBS. When a transmit end and a receive end have a same processing latency, a longer TTI indicates a smaller quantity of HARQ processes that are required to maintain continuous transmission. A smaller quantity of transport blocks transmitted within same time indicates lower overheads of a medium access control (medium access control, MAC) layer header and a Radio Link Control (radio link control, RLC) layer header and lower overheads in cyclic redundancy check (cyclic redundancy check, CRC). On the contrary, if the quantity of transport blocks transmitted within same time is larger, a TTI of each transport block is shorter, and a one-way latency is lower. Selecting such a scheduling rule in some scenarios (for example, a high-speed movement scenario or a burst interference scenario) can improve data transmission efficiency. Therefore, according to the method shown in FIG. 1, proper scheduling rules can be selected to adapt to different scenarios. In addition, each minimum scheduling time unit may further carry a plurality of transport blocks in frequency domain. According to the method shown in FIG. 1, a requirement of a transport block for flexible resource reuse can be further met. For example, using fewer resources in retransmission usually can avoid resource waste and improve spectral efficiency, or using more resources in retransmission can ensure a latency and reliability.

When the scheduling rule includes the quantity T of transport blocks in one time of scheduling, different scheduling rules in the N scheduling rules include different quantities T of transport blocks in one time of scheduling. In other words, proportion relationships, between a quantity of transport blocks and a quantity of minimum scheduling time units in one time of scheduling, determined according to different scheduling rules may be different. When the scheduling rule includes the mapping relationship between T transport blocks and S minimum scheduling time units in one time of scheduling, proportion relationships, between a quantity of transport blocks and a quantity of minimum scheduling time units in one time of scheduling, indicated by different scheduling rules in the N scheduling rules may also be different. In view of the above, the proportion relationships, between a quantity of transport blocks and a quantity of minimum scheduling time units, determined according to the N scheduling rules may be any two of the following: 1:1, 1:P, Q:P, or Q:1, where both P and Q are positive integers, and P is not equal to Q.

In some embodiments, the scheduling rule may further include at least one of the quantity T of transport blocks in one time of scheduling, the mapping relationship between T transport blocks and S minimum scheduling time units in one time of scheduling, and a quantity of minimum scheduling time units to which one transport block is mapped in one time of scheduling.

To help a person skilled in the art understand the technical solutions in this application better, the following shows the N scheduling rules by using Table 1. In the embodiment shown in Table 1, it is assumed that a quantity of minimum scheduling time units in one time of scheduling is 4.

TABLE 1

| Scheduling rule sequence number | Quantity of transport blocks | Mapping relationship between a transport block and a minimum scheduling time unit |
| --- | --- | --- |
| 1 | 1 | $T_1\sim(S_1, S_2, S_3, S_4)$ |
| 2 | 2 | $T_1\sim(S_1, S_2), T_2\sim(S_3, S_4)$ |
| 3 | 4 | $T_1\sim(S_1), T_2\sim(S_2), T_3\sim(S_3), T_4\sim(S_4)$ |

The scheduling rule shown in Table 1 includes the quantity of transport blocks in one time of scheduling and the mapping relationship between T transport blocks and S minimum scheduling time units in one time of scheduling, where $T_t\sim(S_s)$ represents that a $t^{th}$ transport block in the T transport blocks is mapped to an $s^{th}$ minimum scheduling time unit in the S minimum scheduling time units. For example, in the foregoing scheduling rule 3, $T_1\sim(S_1)$ represents that a first transport block in the four transport blocks is mapped to a first minimum scheduling time unit in the four minimum scheduling time units. For another example, in the foregoing scheduling rule 2, $T_2\sim(S_3, S_4)$ represents that a second transport block in the two transport blocks is mapped to a third minimum scheduling time unit and a fourth minimum scheduling time unit in the four minimum scheduling time units. The scheduling rule shown in Table 1 may be represented in another form. For example, the scheduling rule may include only the quantity of transport blocks in one time of scheduling, or may include only the mapping relationship between T transport blocks and S minimum scheduling time units in one time of scheduling.

Table 2 shows another scheduling rule.

TABLE 2

| Scheduling rule sequence number | Quantity of minimum scheduling time units to which one transport block is mapped |
|---|---|
| 1 | 1 |
| 2 | 2 |
| 3 | 3 |
| 4 | 4 |
| 5 | 5 |
| 6 | 6 |
| 7 | 7 |
| 8 | 8 |

Table 3 shows another scheduling rule.

TABLE 3

| Scheduling rule sequence number | Quantity of minimum scheduling time units to which one transport block is mapped |
|---|---|
| 1 | 1 |
| 2 | 2 |
| 3 | 4 |
| 4 | 8 |

The scheduling rules shown in Table 2 and Table 3 include a quantity of minimum scheduling time units to which each of the T transport blocks is mapped in one time of scheduling. The current quantity T of transport blocks in one time of scheduling and the mapping relationship between T transport blocks and S minimum scheduling time units in one time of scheduling may be determined according to the foregoing rules and the quantity S of minimum scheduling time units in one time of scheduling. For example, if the scheduling rule 2 is used, and the quantity S of minimum scheduling time units in one time of scheduling is 4, it may be learned that the current quantity T of transport blocks in one time of scheduling is 2, and two TBs are respectively mapped to first and second minimum scheduling time units, and third and fourth minimum scheduling time units.

It may be understood that the foregoing scheduling rule is merely intended to help a person skilled in the art understand a meaning of the scheduling rule better, and is not intended to limit scheduling rule. For example, the scheduling rule may be a subset, extension, or modification of the rule in the foregoing table. For example, there may be only two scheduling rules in Table 1 in an actual system, where one scheduling rule is that one transport block is mapped to S minimum scheduling time units (the scheduling rule 1), and the other scheduling rule is that S transport blocks are mapped to S minimum scheduling time units (the scheduling rule 3).

In some embodiments, the network side device may determine parameter information used when the network side device communicates with the terminal device, and then determine, based on a correspondence between parameter information and a scheduling rule, a scheduling rule corresponding to the determined parameter information in the N scheduling rules as the target scheduling rule. The parameter information may be a subcarrier spacing used when the network side device communicates with the communications device. The parameter information may be alternatively a quantity of symbols occupied by a minimum scheduling time unit that are used when the network side device communicates with the communications device. The parameter information may be alternatively a subcarrier spacing used when the network side device communicates with the terminal device and a quantity of symbols occupied by a minimum scheduling time unit that are used when the network side device communicates with the communications device.

Table 4 shows a correspondence between parameter information and a scheduling rule. The parameter information in Table 4 is a subcarrier spacing.

TABLE 4

| Subcarrier spacing | Scheduling rule sequence number |
|---|---|
| 15 kHz | 3 |
| 30 kHz | 2 |
| 60 kHz | 1 |

A scheduling rule represented by the scheduling rule sequence number shown in Table 4 is the same as a scheduling rule represented by a same sequence number shown in Table 1. For example, a scheduling rule whose scheduling rule sequence number is 3 in Table 4 is a scheduling rule whose scheduling rule sequence number is 3 in Table 1, to be specific, the quantity of transport blocks is 4, and $T_1 \sim (S_1)$, $T_2 \sim (S_2)$, $T_3 \sim (S_3)$, and $T_4 \sim (S_4)$.

Table 5 shows another correspondence between parameter information and a scheduling rule. The parameter information in Table 5 is a subcarrier spacing, and the scheduling rule is a quantity of minimum scheduling time units to which one transport block is mapped.

TABLE 5

| Subcarrier spacing | Quantity of minimum scheduling time units to which one transport block is mapped |
|---|---|
| 15 kHz | 1 |
| 30 kHz | 1 or 2 |
| 60 kHz | 1, 2, or 4 |

To avoid redundancy, Table 5 represents a plurality of embodiments in a table form. For example, in an embodiment, when the subcarrier spacing is 30 kHz, the quantity of minimum scheduling time units to which one transport block is mapped is 1, and when the subcarrier spacing is 60 kHz, the quantity of minimum scheduling time units to which one transport block is mapped is 2. In some other embodiments, when the subcarrier spacing is 30 kHz, the quantity of minimum scheduling time units to which one transport block is mapped is 2, and when the subcarrier spacing is 60 kHz, the quantity of minimum scheduling time units to which one transport block is mapped is 4, and so on.

Table 6 shows another correspondence between parameter information and a scheduling rule. The parameter information in Table 6 is a quantity of symbols occupied by one minimum scheduling time unit.

TABLE 6

| Quantity of symbols occupied by a minimum scheduling time unit | Scheduling rule sequence number |
|---|---|
| 14 | 3 |
| 7 | 2 |

Similar to Table 4, a scheduling rule represented by the scheduling rule sequence number shown in Table 6 is the same as a scheduling rule represented by a same sequence number shown in Table 1.

Table 7 shows another correspondence between parameter information and a scheduling rule. Transmission information in Table 7 is a subcarrier spacing and a quantity of symbols occupied by one minimum scheduling time unit.

TABLE 7

| Subcarrier spacing | Quantity of symbols occupied by a minimum scheduling time unit | Scheduling rule sequence number |
|---|---|---|
| 15 kHz | 14 | 3 |
| 30 kHz | 7 | 2 |
| 60 kHz | 7 | 1 |

Similar to Table 4 and Table 6, a scheduling rule represented by the scheduling rule sequence number shown in Table 7 is the same as a scheduling rule represented by a same sequence number shown in Table 1.

Table 8 shows another correspondence between parameter information and a scheduling rule. Transmission information in Table 8 is a subcarrier spacing and a quantity of symbols occupied by one minimum scheduling time unit.

TABLE 8

| Subcarrier spacing | Quantity of symbols occupied by a minimum scheduling time unit | Quantity of minimum scheduling time units to which one transport block is mapped |
|---|---|---|
| 15 kHz | 14 | 1 |
| 15 kHz | 7 | 1 or 2 |
| 30 kHz | 14 | 1 or 2 |
| 30 kHz | 7 | 1, 2, or 4 |
| 60 kHz | 14 | 1, 2, or 4 |
| 60 kHz | 7 | 1, 2, 4, or 8 |

Similar to Table 5, to avoid redundancy, Table 8 represents a plurality of embodiments in a table form.

It may be understood that the foregoing scheduling rule is merely intended to help a person skilled in the art understand a meaning of the scheduling rule better, and no limitation is imposed on the scheduling rule. For example, the scheduling rule may be a subset, extension, or modification of the rule in the foregoing table. For another example, a subcarrier spacing in 5G/NR may be alternatively 3.75 kHz, 7.5 kHz, 120 kHz, 240 kHz, 480 kHz, or 960 kHz, and a quantity of symbols occupied by a minimum scheduling time unit may be alternatively 1, 2, 3, or 4. For another example, a quantity of minimum time units in one time of scheduling is not limited to S=4 in Table 1, and may be any positive integer value, for example, S=1, 2, 3, 5, 6, 7, or 8. Similar scheduling rules may be defined or specified for those configurations, and details are not described herein.

Further, in some embodiments, the terminal device can support only one type of subcarrier spacing and a quantity of symbols occupied by a minimum scheduling time unit. In this case, the terminal device may determine that the target scheduling rule is a scheduling rule corresponding to the subcarrier spacing and/or the quantity of symbols occupied by a minimum scheduling time unit that are/is supported by the terminal.

In some embodiments, if duration of one minimum scheduling time unit is shorter, a quantity of minimum scheduling time units to which one transport block is mapped is larger. For example, when a subcarrier spacing is 15 KHz, and a quantity of OFDM symbols occupied by one minimum scheduling time unit is 14, duration of one minimum scheduling time unit is 1 ms, and a quantity of minimum scheduling time units to which one transport block is mapped is 1. When one transport block is mapped to fewer minimum scheduling time units, a TTI of one transport block is shorter. A shorter TTI of each transport block indicates a lower one-way latency. In this way, a latency problem caused due to an excessively long TTI can be avoided, for example, a one-way latency requirement of 4 ms in 5G eMBB is met. For another example, when a subcarrier spacing is 60 kHz, and a quantity of OFDM symbols occupied by one minimum scheduling time unit is 7, duration of one minimum scheduling time unit is 0.125 ms, and a quantity of minimum scheduling time units to which one transport block is mapped may be 4. When one transport block is mapped to more minimum scheduling time units, a TTI of one transport block is longer. In this way, a coverage distance of the transport block is increased. When one transport block is mapped to a plurality of minimum scheduling time units, a larger transport block may be transmitted, and a higher coding gain may be obtained based on a larger TBS. When the transmit end and the receive end have a same processing latency, a longer TTI indicates, based on the same processing latency and a same transmission latency, a smaller quantity of HARQ processes that are required to maintain continuous transmission. In addition, if a quantity of transport blocks scheduled within same time is smaller, overheads of a MAC layer header and an RLC layer header and overheads of CRC can be reduced, and control overheads can be further reduced (for example, downlink control and HARQ feedback overheads).

In some other embodiments, the network side device may further determine radio resource information. The network side device determines, based on a correspondence between radio resource information and a scheduling rule, a scheduling rule corresponding to the determined radio resource information in the N scheduling rules as the target scheduling rule. The radio resource information may be a quantity of currently available resource blocks (resource block, RB) of the network side device or a quantity of layers allocated for a code word when multiple-input multiple-output (multiple-input multiple-output, MIMO) communications is used. For example, for 5G/4.5G considering that a smaller scheduling unit may be used (for example, a quantity of symbols occupied by a minimum scheduling time unit may be 1 or 2), to transmit a larger TB, one TB needs to be mapped to a plurality of minimum scheduling time units. For another example, for a cell edge user with restricted power spectrum density and fewer allocated resource blocks, when one transport block is mapped to a plurality of minimum scheduling time units, coverage can be extended, and a larger transport block can be transmitted.

It is assumed that in this case, the N scheduling rules are the three scheduling rules shown in Table 1. If the quantity of currently available RBs is less than a first preset RB quantity threshold, the target scheduling rule may be a scheduling rule whose scheduling rule sequence number is 1, to be specific, one transport block is mapped to four minimum scheduling time units. When the quantity of RBs is relatively small, if one transport block is mapped to a plurality of minimum scheduling time units, a TBS may be enlarged. A higher coding gain may be obtained based on a large TBS, and overheads of a MAC layer header and an RLC layer header and overheads of CRC are reduced. Further, in some embodiments, if the quantity of currently available RBs is greater than the first preset RB quantity threshold, the target scheduling rule may be a scheduling rule whose scheduling rule sequence number is 3, to be specific, one transport block is mapped to one minimum scheduling time unit.

In some other embodiments, the network side device may further determine a working status of the terminal device. The network side device determines, based on a correspondence between a working status of the terminal device and a scheduling rule, a scheduling rule corresponding to the determined working status of the terminal device in the N scheduling rules as the target scheduling rule. The working status of the terminal device may include location information of the terminal device, for example, information indicating that the terminal device is located on a cell edge or a cell center, and whether coverage is restricted. The working status of the terminal device may further include a moving speed of the terminal device, for example, the terminal device is in a high-speed moving state or a low-speed moving state. The working status of the terminal device may be reported by the terminal device to the network side device, or may be obtained by the network side device through measurement.

It is assumed that in this case, the N scheduling rules are the three scheduling rules shown in Table 1. If the terminal device is in a low-speed moving state or is located on a cell edge or is in a coverage-restricted scenario, the target scheduling rule may be a scheduling rule whose scheduling rule sequence number is 1, to be specific, one transport block is mapped to four minimum scheduling time units. In this way, a coverage area of the terminal device can be extended. Further, in some embodiments, the terminal device is in a high-speed moving state or is located in a cell center or is in a non-coverage-restricted scenario, the target scheduling rule may be a scheduling rule whose scheduling rule sequence number is 3, to be specific, one transport block is mapped to one minimum scheduling time unit.

In some other embodiments, the network side device may further determine radio environment information. The network side device determines, based on a correspondence between radio environment information and a scheduling rule, a scheduling rule corresponding to the determined radio environment information in the N scheduling rules as the target scheduling rule. The radio environment information may be channel-related measurement information, or may be information related to current network configuration or scheduling, for example, information about whether burst interference occurs in a neighboring cell, or information about whether there is impact of ultra-reliable and low latency communications (ultra-reliable low latency communications, URLLC) (for example, resource preemption and puncturing). For example, a system bandwidth is usually divided into two parts: only an Enhanced Mobile Broadband (enhanced mobile broadband, eMBB) service area, where there is no impact of a URLLC service in the area; and a coexistence area of eMBB and URLLC, where the eMBB service in this area may be affected by the URLLC service. For the coexistence area of eMBB and URLLC, a scheduling rule may be a scheduling rule whose scheduling rule sequence number is 3 shown in Table 1, to be specific, one transport block is mapped to one minimum scheduling time unit, so as to better confront the impact of URLLC.

It is assumed that in this case, the N scheduling rules are the three scheduling rules shown in Table 1. When burst interference occurs in a neighboring cell or there is impact of URLLC, the target scheduling rule may be a scheduling rule whose scheduling rule sequence number is 3, to be specific, one transport block is mapped to one minimum scheduling time unit. When no burst interference occurs in a neighboring cell or there is no impact of URLLC, the target scheduling rule may be a scheduling rule whose scheduling rule sequence number is 1, to be specific, one transport block is mapped to four minimum scheduling time units. When burst interference occurs in a neighboring cell or there is impact of URLLC, the burst interference in the neighboring cell or the URLLC interference may affect data on only one minimum scheduling time unit. When one transport block is mapped to a plurality of minimum scheduling time units, the plurality of minimum scheduling time units have only one piece of corresponding feedback information. Therefore, data on all scheduled minimum time units may need to be retransmitted. If one transport block is mapped to one minimum scheduling time unit, each minimum scheduling time unit has control information and feedback information. In this way, only data on an affected minimum time unit needs to be retransmitted, and there is a spectral efficiency performance gain, so as to obtain better link performance. In addition, if each transport block is scheduled to only one minimum scheduling time unit, a collision conflict between eMBB and URLLC can be avoided through scheduling.

In addition to determining the target scheduling rule based on whether the interference occurs in the neighboring cell or whether the URLLC interference occurs, the network side device may select a proper target scheduling rule based on another parameter or scenario that may reflect channel quality. A larger channel change or a greater deviation between channels on different symbols or subbands indicates a smaller quantity of minimum scheduling time units to which one transport block is mapped, and a smaller channel change or a smaller deviation between channels on different symbols or subbands indicates a larger quantity of minimum scheduling time units to which one transport block is mapped.

In some other embodiments, the network side device may further determine the target scheduling rule from the N scheduling rules based on two or more pieces of information in the foregoing information. For example, when a latency requirement is met and no interference occurs, one transport block may be mapped to a plurality of minimum scheduling units even in a cell center user scenario or in a non-coverage-restricted scenario.

In some embodiments, before step 102, the network side device may further send target scheduling rule indication information to the terminal device, where the target scheduling rule indication information is used to indicate the target scheduling rule determined by the network side device. That the terminal device determines a target scheduling rule includes: the terminal device determines the target scheduling rule according to the received target scheduling rule indication information.

It may be understood that the target scheduling rule determined by the network side device is a target scheduling rule supported by the terminal device.

In some embodiments, before step 101, the terminal device may send scheduling rule information to the network side device, where the scheduling rule information is used to indicate a scheduling rule supported by the terminal device to the network side device.

In some embodiments, the network side device may send the target scheduling rule indication information to the terminal device in an explicit or implicit manner.

In some embodiments, the target scheduling rule indication information includes at least one of the following: a subcarrier spacing, a quantity of symbols occupied by a minimum scheduling time unit, a downlink control information (downlink control information, DCI) format, a modulation and coding scheme (modulation and coding, MCS), a cyclic redundancy check code, and a quantity of allocated resource blocks.

For example, the terminal device may store, predefine, or generate the correspondence between a subcarrier spacing and a scheduling rule shown in Table 4. If the network side device currently configures or uses a subcarrier spacing of 15 kHz, the determined target scheduling rule is a scheduling rule whose sequence number is 3, and the network side device may indicate, in an explicit or implicit manner, that the terminal device uses the subcarrier spacing of 15 kHz. Explicit notification includes control signaling notification (for example, a broadcast channel, higher layer signaling, or physical layer signaling), and implicit notification includes determining the subcarrier spacing by blindly detecting a broadcast channel, a synchronization channel, or the like by a user. In this case, the terminal device may determine, based on the correspondence between a subcarrier spacing and a scheduling rule, the scheduling rule whose scheduling rule sequence number is 3 as the target scheduling rule.

For another example, the terminal device may store, predefine, or generate the correspondence between a quantity of symbols occupied by a minimum scheduling time unit and a scheduling rule shown in Table 6. If the network side device currently configures or uses 14 symbols occupied by a minimum scheduling time unit, the determined target scheduling rule is a scheduling rule whose sequence number is 3, and the network side device may indicate that the terminal device uses the 14 symbols occupied by a minimum scheduling time unit. In this case, the terminal device may determine, based on the correspondence between a quantity of symbols occupied by a minimum scheduling time unit and a scheduling rule, the scheduling rule whose scheduling rule sequence number is 3 as the target scheduling rule.

For another example, the terminal device may store, predefine, or generate the correspondence shown in Table 7. If the network side device currently configures or uses a subcarrier spacing of 15 kHz and 14 symbols occupied by a minimum scheduling time unit, the determined target scheduling rule is a scheduling rule whose sequence number is 3, and the network side device may indicate that the terminal device uses the subcarrier spacing of 15 kHz and the 14 symbols occupied by a minimum scheduling time unit. In this case, the terminal device may determine, based on the correspondence between a quantity of symbols occupied by a minimum scheduling time unit and a scheduling rule, the scheduling rule whose scheduling rule sequence number is 3 as the target scheduling rule.

For another example, the network side device and the terminal device may store, predefine, or generate a correspondence between a DCI format and a scheduling rule shown in Table 9.

TABLE 9

| DCI format | Scheduling rule sequence number |
|---|---|
| A | 3 |
| B | 2 |
| C | 1 |

A, B, and C shown in Table 9 represent different DCI formats. If the target scheduling rule determined by the network side device is a scheduling rule whose sequence number is 3, the network side device may use the DCI format A. In this case, the terminal device may determine, based on the detected correspondence between a DCI format and a scheduling rule, the scheduling rule whose scheduling rule sequence number is 3 as the target scheduling rule.

For another example, the network side device and the terminal device may store, predefine, or generate a correspondence between an MCS and a scheduling rule shown in Table 10.

TABLE 10

| MCS index | Scheduling rule sequence number |
|---|---|
| $MCS_1$-$MCS_2$ | 3 |
| $MCS_3$-$MCS_4$ | 2 |
| $MCS_5$-$MCS_6$ | 1 |

The $MCS_1$ to the $MCS_6$ in Table 10 represent different MCS indexes. If the network side device configures or uses an MCS between the $MCS_1$ and the $MCS_2$, the determined target scheduling rule is a scheduling rule whose sequence number is 3, and the network side device may indicate that an MCS used by the terminal device is a value between the $MCS_1$ and the $MCS_2$. In this case, the terminal device may determine, based on the correspondence between an MCS and a scheduling rule, the scheduling rule whose scheduling rule sequence number is 3 as the target scheduling rule.

For another example, the network side device and the terminal device may store, predefine, or generate a correspondence between a CRC and a scheduling rule shown in Table 11.

TABLE 11

| CRC | Scheduling rule sequence number |
|---|---|
| $CRC_1$ | 3 |
| $CRC_2$ | 2 |
| $CRC_3$ | 1 |

The $CRC_1$, the $CRC_2$, and the $CRC_3$ in Table 11 represent three different CRCs. If the target scheduling rule determined by the network side device is a scheduling rule whose sequence number is 3, the network side device may add a CRC of $CRC_1$ to DCI. In this case, after determining the CRC, the terminal device may determine, based on the correspondence between a CRC and a scheduling rule, the scheduling rule whose scheduling rule sequence number is 3 as the target scheduling rule.

For another example, the network side device and the terminal device may store, predefine, or generate a correspondence between a quantity of RBs and a scheduling rule shown in Table 12.

TABLE 12

| Quantity of RBs | Scheduling rule sequence number |
|---|---|
| $RB \leq RB_1$ | 3 |
| $RB_1 < RB < RB_2$ | 2 |
| $RB \geq RB_2$ | 1 |

As shown in Table 12, if a quantity of RBs that are configured or used by the network side device is less than or equal to $RB_1$, the determined target scheduling rule is a scheduling rule whose sequence number is 3, and the network side device may indicate that a quantity of RBs used by the terminal device is less than or equal to $RB_1$. In this case, the terminal device may determine, based on the correspondence between a quantity of RBs and a scheduling rule, the scheduling rule whose scheduling rule sequence number is 3 as the target scheduling rule.

It may be understood that all the foregoing tables and correspondences are merely intended to help a person skilled in the art understand this embodiment better, and no limitation is imposed on the correspondence. For example, the correspondence may be a subset, extension, or modification of the correspondence in the foregoing table. For example, in the foregoing embodiments, the scheduling rule in Table 1 is used as an example. An example of using the scheduling rule in Table 2 or Table 3 is similar, and details are not described herein again.

In some embodiments, the target scheduling rule information may be corresponding to a search space location of DCI. It may be understood that because search space in which the DCI is located is only common search space and user search space, only two scheduling rules can be indicated by using the search space in which the DCI is located. For example, if the network side device determines that the target scheduling rule is a scheduling rule whose sequence number is 3, the DCI may be carried in the common search space; or if the network side device determines that the target scheduling rule is a scheduling rule whose sequence number is 1, the DCI may be carried in the user search space. The terminal device may determine the target scheduling rule based on the detected location of the DCI.

It may be understood that in some embodiments, considering that only two scheduling rules can be indicated by using the search space in which the DCI is located, optionally, a remaining scheduling rule may be indicated in another manner, for example, by using a CRC or a quantity of RBs.

In some embodiments, the target scheduling rule information may be corresponding to a resource location of DCI. It may be understood that the terminal device may determine the target scheduling rule based on the detected resource location (for example, an RB number, a subband number, or a CCE number) of the DCI.

In some other embodiments, the network side device may send the target scheduling rule indication information to the terminal device in an explicit manner. Specifically, the network side device may send the target scheduling rule indication information to the terminal device by using some fields in control signaling. The control signaling may be MAC layer control signaling or physical layer control signaling.

In some embodiments, a field used to indicate the target scheduling rule (referred to as a target scheduling rule indication field below) may be a newly-added field in the control signaling. Using DCI as an example, the target scheduling rule indication field may be added to the DCI. After determining the target scheduling rule, the network side device may set a value of the target scheduling rule indication field to a value corresponding to the target scheduling rule. After receiving the DCI, the terminal device may determine the target scheduling rule based on the value of the target scheduling rule indication field in the DCI. In addition, the target scheduling rule may also be indicated by using higher layer signaling such as MAC layer signaling or radio resource control (radio resource control, RRC) layer signaling.

Optionally, in some embodiments, the scheduling rule may include only the quantity T of transport blocks in one time of scheduling. In addition, S can be exactly divided by the quantity T of transport blocks in one time of scheduling. In this case, the mapping relationship between T transport blocks and S minimum scheduling time units in one time of scheduling is: each of the T transport blocks is mapped to one of the S minimum scheduling time units; each of the T transport blocks is mapped to the S minimum scheduling time units; or each of the T transport blocks is mapped to $S_t$ consecutive minimum scheduling time units in the S minimum scheduling time units, where $S=S_t \times T$, and $S_t$ is a positive integer greater than 1 and less than S. Still further, that each of the T transport blocks is mapped to $S_t$ consecutive minimum scheduling time units in the S minimum scheduling time units includes: a $t^{th}$ transport block in the T transport blocks is mapped to a $((t-1) \times S_t+1)^{th}$ minimum scheduling time unit to a $(t \times S_t)^{th}$ minimum scheduling time unit in the S minimum scheduling time units, where $t=1, \ldots,$ or T, $S_t=S/T$, and x is a multiplication sign.

For example, it is assumed that a quantity of minimum scheduling time units in one time of scheduling is 4. If the target scheduling rule includes that the quantity of transport blocks in one time of scheduling is 2, a first transport block in the two transport blocks is mapped to a first minimum scheduling time unit and a second minimum scheduling time unit, and a second transport block in the two transport blocks is mapped to a third minimum scheduling time unit and a fourth minimum scheduling time unit. If the target scheduling rule determined by the terminal device includes that the quantity of transport blocks in one time of scheduling is 4, the terminal device may determine that the four transport blocks are respectively mapped to the four minimum scheduling time units.

The network side device may store, predefine, or generate the mapping relationship between T transport blocks and S minimum scheduling time units in one time of scheduling. In this way, the network side device may determine, based on the quantity of transport blocks in one time of scheduling that is included in the target scheduling rule and the mapping relationship between T transport blocks and S minimum scheduling time units in one time of scheduling that is stored, predefined, or generated by the network side device, a minimum scheduling time unit to which each transport block is mapped.

Similarly, the terminal device may also store, predefine, or generate the mapping relationship between T transport blocks and S minimum scheduling time units in one time of scheduling. The terminal device may determine, based on the quantity of transport blocks in one time of scheduling that is included in the target scheduling rule and the mapping relationship between T transport blocks and S minimum scheduling time units in one time of scheduling that is stored, predefined, or generated by the terminal device, a minimum scheduling time unit to which each transport block is mapped.

In some other embodiments, each of the N scheduling rules may include only a quantity of minimum scheduling time units to which one transport block is mapped in one time of scheduling. In addition, the quantity of minimum scheduling time units to which one transport block is mapped in one time of scheduling that is included in each scheduling rule can be exactly divided by S. In this case, the mapping relationship between T transport blocks and S minimum scheduling time units in one time of scheduling is: each of the T transport blocks is mapped to one of the S minimum scheduling time units; each of the T transport blocks is mapped to the S minimum scheduling time units; or each of the T transport blocks is mapped to $S_t$ consecutive minimum scheduling time units in the S minimum scheduling time units, where $S=S_t \times T$, and $S_t$ is a positive integer greater than 1 and less than S. Still further, that each of the T transport blocks is mapped to $S_t$ consecutive minimum scheduling time units in the S minimum scheduling time units includes: a $t^{th}$ transport block in the T transport blocks is mapped to a $((t-1)\times S_t+1)^{th}$ minimum scheduling time unit to a $(t\times S_t)^{th}$ minimum scheduling time unit in the S minimum scheduling time units, where t=1, . . . , or T, and $S_t$=S/T.

For example, it is assumed that a quantity of minimum scheduling time units in one time of scheduling is 4. If the target scheduling rule includes that the quantity of minimum scheduling time units to which one transport block is mapped in one time of scheduling is 2, the quantity of transport blocks in one time of scheduling is 2, a first transport block in the two transport blocks is mapped to a first minimum scheduling time unit and a second minimum scheduling time unit, and a second transport block in the two transport blocks is mapped to a third minimum scheduling time unit and a fourth minimum scheduling time unit. If the target scheduling rule includes that the quantity of minimum scheduling time units to which one transport block is mapped in one time of scheduling is 4, the quantity of transport blocks in one time of scheduling is 1, and the terminal device may determine that one transport block is separately mapped to the four minimum scheduling time units.

The network side device may store, predefine, or generate the mapping relationship between T transport blocks and S minimum scheduling time units in one time of scheduling. In this way, the network side device may determine, based on the quantity of minimum scheduling time units to which one transport block is mapped in one time of scheduling that is included in the target scheduling rule and the mapping relationship between T transport blocks and S minimum scheduling time units in one time of scheduling that is stored, predefined, or generated by the network side device, the quantity of transport blocks in one time of scheduling and a minimum scheduling time unit to which each transport block is mapped.

Similarly, the terminal device may also store, predefine, or generate the mapping relationship between T transport blocks and S minimum scheduling time units in one time of scheduling. The terminal device may determine, based on the quantity of minimum scheduling time units to which one transport block is mapped in one time of scheduling that is included in the target scheduling rule and the mapping relationship between T transport blocks and S minimum scheduling time units in one time of scheduling that is stored, predefined, or generated by the terminal device, the quantity of transport blocks in one time of scheduling and a minimum scheduling time unit to which each transport block is mapped.

In some embodiments, each of the N scheduling rules may include only the quantity T of transport blocks in one time of scheduling. In these embodiments, S may be or may not be exactly divided by the quantity T of transport blocks in one time of scheduling. In addition, in these embodiments, the mapping relationship between T transport blocks and S minimum scheduling time units in one time of scheduling is as follows: Each of the T transport blocks is mapped to one of the S minimum scheduling time units; each of the T transport blocks is mapped to the S minimum scheduling time units; if S/T is a positive integer greater than 1 and less than S, each of the T transport blocks is mapped to $S_t$ consecutive minimum scheduling time units in the S minimum scheduling time units, where $S=S_t\times T$, and $S_t$ is an integer greater than 1 and less than S; or if S/T is not a positive integer, a first transport block in the T transport blocks is mapped to a+b minimum scheduling time units, and each of the T transport blocks except the first transport block is mapped to a minimum scheduling time units, where both a and b are positive integers, b is less than T, and S=a×T+b.

Still further, that each of the T transport blocks is mapped to $S_t$ consecutive minimum scheduling time units in the S minimum scheduling time units includes: a $t^{th}$ transport block in the T transport blocks is mapped to a $((t-1)\times S_t+1)^{th}$ minimum scheduling time unit to a $(t\times S_t)^{th}$ minimum scheduling time unit in the S minimum scheduling time units, where t=1, . . . , or T, and $S_t$=S/T.

For example, it is assumed that a quantity of minimum scheduling time units in one time of scheduling is 4. If the target scheduling rule includes that the quantity of transport blocks in one time of scheduling is 2, a first transport block in the two transport blocks is mapped to a first minimum scheduling time unit and a second minimum scheduling time unit, and a second transport block in the two transport blocks is mapped to a third minimum scheduling time unit and a fourth minimum scheduling time unit. If the target scheduling rule includes that the quantity of transport blocks in one time of scheduling is 3, a first transport block in the three transport blocks is mapped to a first minimum scheduling time unit and a second minimum scheduling time unit, and a second transport block and a third transport block in the three transport blocks are respectively mapped to a third minimum scheduling time unit and a fourth minimum scheduling time unit.

The network side device may store, predefine, or generate the mapping relationship between T transport blocks and S minimum scheduling time units in one time of scheduling. In this way, the network side device may determine, based on the quantity of transport blocks in one time of scheduling that is included in the target scheduling rule and the mapping relationship between T transport blocks and S minimum scheduling time units in one time of scheduling that is stored, predefined, or generated by the network side device, a minimum scheduling time unit to which each transport block is mapped.

Similarly, the terminal device may also store, predefine, or generate the mapping relationship between T transport blocks and S minimum scheduling time units in one time of scheduling. The terminal device may determine, based on the quantity of transport blocks in one time of scheduling that is included in the target scheduling rule and the mapping relationship between T transport blocks and S minimum scheduling time units in one time of scheduling that is stored, predefined, or generated by the terminal device, a minimum scheduling time unit to which each transport block is mapped.

In some embodiments, each of the N scheduling rules may include only the quantity T of transport blocks in one time of scheduling. In these embodiments, S may be or may not be exactly divided by the quantity T of transport blocks in one time of scheduling. In addition, in these embodiments, the mapping relationship between T transport blocks and S minimum scheduling time units in one time of scheduling is as follows: Each of the T transport blocks is mapped to one of the S minimum scheduling time units; each of the T transport blocks is mapped to the S minimum scheduling time units; if S/T is a positive integer greater than 1 and less than S, each of the T transport blocks is mapped to $S_t$ consecutive minimum scheduling time units in the S minimum scheduling time units, where $S=S_t\times T$, and $S_t$ is an integer greater than 1 and less than S; or if S/T is not a positive integer, a $T^{th}$ transport block in the T transport blocks is mapped to a+b minimum scheduling time units, and each of the T transport blocks except the $T^{th}$ transport block is mapped to a minimum scheduling time units, where both a and b are positive integers, b is less than T, and S=a×T+b.

Still further, that each of the T transport blocks is mapped to $S_t$ consecutive minimum scheduling time units in the S minimum scheduling time units includes: a $t^{th}$ transport block in the T transport blocks is mapped to a $((t-1) \times S_t+1)^{th}$ minimum scheduling time unit to a $(t \times S_t)^{th}$ minimum scheduling time unit in the S minimum scheduling time units, where t=1, . . . , or T, and $S_t$=S/T.

For example, it is assumed that a quantity of minimum scheduling time units in one time of scheduling is 4. If the target scheduling rule includes that the quantity of transport blocks in one time of scheduling is 2, a first transport block in the two transport blocks is mapped to a first minimum scheduling time unit and a second minimum scheduling time unit, and a second transport block in the two transport blocks is mapped to a third minimum scheduling time unit and a fourth minimum scheduling time unit. If the target scheduling rule includes that the quantity of transport blocks in one time of scheduling is 3, a third transport block in the three transport blocks is mapped to a third minimum scheduling time unit and a fourth minimum scheduling time unit, and a first transport block and a second transport block in the three transport blocks are respectively mapped to a first minimum scheduling time unit and a second minimum scheduling time unit.

The network side device may store, predefine, or generate the mapping relationship between T transport blocks and S minimum scheduling time units in one time of scheduling. In this way, the network side device may determine, based on the quantity of transport blocks in one time of scheduling that is included in the target scheduling rule and the mapping relationship between T transport blocks and S minimum scheduling time units in one time of scheduling that is stored, predefined, or generated by the network side device, a minimum scheduling time unit to which each transport block is mapped.

Similarly, the terminal device may also store, predefine, or generate the mapping relationship between T transport blocks and S minimum scheduling time units in one time of scheduling. The terminal device may determine, based on the quantity of transport blocks in one time of scheduling that is included in the target scheduling rule and the mapping relationship between T transport blocks and S minimum scheduling time units in one time of scheduling that is stored, predefined, or generated by the terminal device, a minimum scheduling time unit to which each transport block is mapped.

In some other embodiments, each of the N scheduling rules may include only the quantity T of transport blocks in one time of scheduling. In these embodiments, S may be or may not be exactly divided by the quantity T of transport blocks in one time of scheduling. In these embodiments, the mapping relationship between T transport blocks and S minimum scheduling time units in one time of scheduling is as follows: Each of the T transport blocks is mapped to one of the S minimum scheduling time units; each of the T transport blocks is mapped to the S minimum scheduling time units; if S/T is a positive integer greater than 1 and less than S, each of the T transport blocks is mapped to $S_t$ consecutive minimum scheduling time units in the S minimum scheduling time units, where $S=S_t \times T$, and $S_t$ is an integer greater than 1 and less than S; or if S/T is not a positive integer, a first transport block in the T transport blocks is mapped to a+b minimum scheduling time units, a $T^{th}$ transport block in the T transport blocks is mapped to a+c minimum scheduling time units, and each of the T transport blocks except the first transport block and the $T^{th}$ transport block is mapped to a minimum scheduling time units, where a, b, and c all are positive integers, b+c is less than T, and S=a×T+b+c. Still further, if (S−a×T) can be exactly divided by 2, b is equal to c. If (S−a×T) cannot be exactly divided by 2, the preset rule may further include b=c+1, or the preset scheduling rule may further include c=b+1.

For example, it is assumed that a quantity of minimum scheduling time units in one time of scheduling is 8. If the target scheduling rule includes that the quantity of transport blocks in one time of scheduling is 4, each of the four transport blocks is mapped to two minimum scheduling time units. If the target scheduling rule includes that the quantity of transport blocks in one time of scheduling is 3, a first transport block in the three transport blocks is mapped to a first minimum scheduling time unit to a third minimum scheduling time unit, a second transport block in the three transport blocks is mapped to a fourth minimum scheduling time unit and a fifth minimum scheduling time unit, and a third transport block in the three transport blocks is mapped to a sixth minimum scheduling time unit to an eighth minimum scheduling time unit. It is assumed that the preset scheduling rule includes: if (S−a×T) cannot be exactly divided by 2, b=c+1. If the target scheduling rule includes that the quantity of transport blocks in one time of scheduling is 5, a first transport block in the five transport blocks is mapped to a first minimum scheduling time unit to a third minimum scheduling time unit, a second transport block to a fourth transport block in the five transport blocks are respectively mapped to a fourth minimum scheduling time unit to a sixth minimum scheduling time unit, and a fifth transport block in the five transport blocks is mapped to a seventh minimum scheduling time unit and an eighth minimum scheduling time unit. It is assumed that the preset rule includes: if (S−a×T) cannot be exactly divided by 2, c=b+1. In this case, a first transport block in the five transport blocks is mapped to a first minimum scheduling time unit and a second minimum scheduling time unit, a second transport block to a fourth transport block in the five transport blocks are separately mapped to a second minimum scheduling time unit to a fifth minimum scheduling time unit, and a fifth transport block in the five transport blocks is mapped to a sixth minimum scheduling time unit to an eighth minimum scheduling time unit.

The network side device may store, predefine, or generate the mapping relationship between T transport blocks and S minimum scheduling time units in one time of scheduling. In this way, the network side device may determine, based on the quantity of transport blocks in one time of scheduling that is included in the target scheduling rule and the mapping relationship between T transport blocks and S minimum scheduling time units in one time of scheduling that is stored, predefined, or generated by the network side device, a minimum scheduling time unit to which each transport block is mapped.

Similarly, the terminal device may also store, predefine, or generate the mapping relationship between T transport blocks and S minimum scheduling time units in one time of scheduling. The terminal device may determine, based on the quantity of transport blocks in one time of scheduling that is included in the target scheduling rule and the mapping relationship between T transport blocks and S minimum scheduling time units in one time of scheduling that is stored, predefined, or generated by the terminal device, a minimum scheduling time unit to which each transport block is mapped.

Although the scheduling rule in the foregoing embodiments may include only the quantity T of transport blocks in one time of scheduling or the quantity of minimum scheduling time units to which one transport block is mapped in one time of scheduling, or the scheduling rule may include the mapping relationship between T transport blocks and S minimum scheduling time units in one time of scheduling. It may be understood that when the scheduling rule includes the mapping relationship between T transport blocks and S minimum scheduling time units in one time of scheduling, the terminal device and the network side device may pre-store or predefine the mapping relationship between T transport blocks and S minimum scheduling time units in one time of scheduling, or may not store or predefine the mapping relationship between T transport blocks and S minimum scheduling time units in one time of scheduling.

In addition, in some embodiments, each of the N scheduling rules may alternatively include only the mapping relationship between T transport blocks and S minimum scheduling time units in one time of scheduling. In this case, the terminal device may directly determine the mapping relationship between T transport blocks and S minimum scheduling time units according to the target transmission rule without a need to store, predefine, or generate the mapping relationship between T transport blocks and S minimum scheduling time units, and determine, based on the quantity of transport blocks in one time of scheduling and/or the quantity of minimum scheduling time units to which one transport block is mapped in one time of scheduling that are/is included in the received target scheduling rule, a minimum scheduling time unit to which each transport block is mapped.

In some other embodiments, quantities of minimum scheduling time units to which transport blocks are mapped may be the same or may be different, and a minimum scheduling time unit to which each transport block is mapped may be determined as required. In this case, the scheduling rule includes the mapping relationship between T transport blocks and S minimum scheduling time units in one time of scheduling.

For example, Table 13 shows another scheduling rule. It is assumed that a quantity of minimum scheduling time units in one time of scheduling is 4 in Table 13.

TABLE 13

| Scheduling rule sequence number | Quantity of transport blocks | Mapping relationship between a transport block and a minimum scheduling time unit |
| --- | --- | --- |
| 1 | 1 | $T_1 \sim (S_1, S_2, S_3, S_4)$ |
| 2 | 2 | $T_1 \sim (S_1, S_2), T_2 \sim (S_3, S_4)$ |
| 3 | 2 | $T_1 \sim (S_1), T_2 \sim (S_2, S_3, S_4)$ |
| 4 | 2 | $T_1 \sim (S_1, S_2, S_3), T_2 \sim (S_4)$ |
| 5 | 3 | $T_1 \sim (S_1), T_2 \sim (S_2), T_3 (S_3, S_4)$ |
| 6 | 3 | $T_1 \sim (S_1), T_2 \sim (S_2, S_3), T_3 (S_4)$ |
| 7 | 3 | $T_1 \sim (S_1, S_2), T_2 \sim (S_3), T_3 (S_4)$ |
| 8 | 4 | $T_1 \sim (S_1), T_2 \sim (S_2), T_3 (S_3), T_4 (S_4)$ |

As shown in Table 13, when the quantity of transport blocks is 2, one transport block may be mapped to two minimum scheduling time units, or may be mapped to three minimum scheduling time units or one minimum scheduling time unit.

In this case, the scheduling rule may include the quantity T of transport blocks in one time of scheduling and the mapping relationship between T transport blocks and S minimum scheduling time units in one time of scheduling, or may include only the mapping relationship between T transport blocks and S minimum scheduling time units in one time of scheduling.

In some embodiments, if the scheduling rule includes one or more pieces of information in the quantity T of transport blocks in one time of scheduling, the quantity of minimum scheduling time units to which one transport block is mapped in one time of scheduling, and the mapping relationship between T transport blocks and S minimum scheduling time units in one time of scheduling, the target scheduling rule indication information may indicate all information included in the target scheduling rule.

In some embodiments, the terminal device and the network side device may store, predefine, or generate the N scheduling rules, and each scheduling rule has a corresponding scheduling rule sequence number. In this case, the network side device needs to indicate only a scheduling rule sequence number of the target scheduling rule to the terminal device, and the terminal device may determine specific information of the scheduling rule based on the scheduling rule sequence number. It may be understood that the network side device and the terminal device store, predefine, or generate a same correspondence between a scheduling rule sequence number and a scheduling rule.

For example, using Table 13 as an example, both the terminal device and the network side device may store, predefine, or generate the correspondence between a scheduling rule sequence number and a scheduling rule shown in Table 13. The target scheduling rule indication information needs to indicate only the scheduling rule sequence number corresponding to the target scheduling rule.

In some other embodiments, if the scheduling rule includes at least two pieces of information in the quantity T of transport blocks in one time of scheduling, the quantity of minimum scheduling time units to which one transport block is mapped in one time of scheduling, and the mapping relationship between T transport blocks and S minimum scheduling time units in one time of scheduling, the target scheduling rule indication information may separately indicate the at least two pieces of information.

For example, the network side device may indicate a quantity of transport blocks in one time of scheduling by using specific control information (that is, a subcarrier spacing, a quantity of symbols occupied by each minimum scheduling time unit, a DCI format, an MCS, a cyclic redundancy check code, and a quantity of allocated resource blocks), and then indicate a mapping relationship between a transport block and a minimum scheduling time unit by using another field. For example, the network side device may add some dedicated fields to control signaling to indicate the mapping relationship between a transport block and a minimum scheduling time unit. The network side device may further indicate the mapping relationship between a transport block and a minimum scheduling time unit by using some redundant fields in the control signaling.

Using DCI as an example, in some domains in the DCI, each transport block has a corresponding field. It is assumed that a quantity of schedulable transport blocks in one time of scheduling is X, and a quantity of scheduled transport blocks in the target scheduling rule is Y (X is greater than Y, and both X and Y are positive integers), fields corresponding to X-Y transport blocks are redundant fields. In this case, the fields corresponding to the X-Y transport blocks may be used to indicate the target scheduling rule. In addition, it may be understood that when the quantity of available transport blocks is equal to the quantity of transport blocks in the target scheduling rule, there is no redundant transport block. In this case, there may be a default mapping relationship between a transport block and a minimum scheduling time unit. If the quantity of transport blocks in the target scheduling rule is equal to the quantity of available transport blocks, the mapping relationship between a transport block and a minimum scheduling time unit is the default mapping relationship.

It is assumed that a maximum quantity of schedulable transport blocks in one time of scheduling is 4. If the quantity of scheduled transport blocks in one time of scheduling is 2, fields corresponding to the remaining two unscheduled transport blocks may be used to indicate the mapping relationship between a transport block and a minimum scheduling time unit. If the quantity of transport blocks in one time of scheduling in the target scheduling rule is 4, it may be determined that the mapping relationship between a transport block and a minimum scheduling time unit is the default mapping relationship, to be specific, one transport block is mapped to one minimum scheduling time unit.

In some embodiments, a quantity of scheduling units to which each transport block is mapped may be related to an attribute of the transport block. The attribute of the transport block is whether the transport block is an initially transmitted transport block or a retransmitted transport block. Flexible time domain resource allocation of each transport block can enable each transport block to obtain a performance gain based on a quantity of required scheduling resources.

In some embodiments, a mapping rule of a retransmitted transport block is: each retransmitted transport block is mapped to one minimum scheduling time unit. Each initially transmitted transport block may be mapped to one or more minimum scheduling time units. In addition, the T transport blocks may include no more than one initially transmitted transport block. In this way, using fewer resources in retransmission can avoid resource waste to obtain a throughput gain and a spectral efficiency gain.

It is assumed that all the T transport blocks are retransmitted transport blocks, and each transport block is mapped to one minimum scheduling time unit. It is assumed that the T transport blocks include one initially transmitted transport block and T−1 retransmitted transport blocks (T is not equal to 1), and the T−1 retransmitted transport blocks are in a one-to-one correspondence with the first T−1 minimum scheduling time units in the S minimum scheduling time units, that is, a $t^{th}$ retransmitted transport block in the T−1 retransmitted transport blocks is mapped to a $t^{th}$ minimum scheduling time unit in the S minimum scheduling time units, where t=1, . . . , or T−1. The initially transmitted transport block is mapped to a remaining transport block in the S minimum scheduling time units. If the T transport blocks do not include a retransmitted transport block, T is equal to 1, and the T transport blocks are mapped to the S transport blocks.

For example, if T=1 and S=4, the T transport blocks may include one initially transmitted transport block, and the initially transmitted transport block is mapped to the S minimum scheduling time units.

For another example, if T=2 and S=4, the T transport blocks may include one initially transmitted transport block and one retransmitted transport block. The retransmitted transport block is mapped to a first minimum scheduling time unit in the S minimum scheduling time units, and the initially transmitted transport block is mapped to a second minimum scheduling time unit to a fourth minimum scheduling time unit in the S minimum scheduling time units.

For another example, if T=3 and S=4, the T transport blocks may include one initially transmitted transport block and two retransmitted transport blocks. A first retransmitted transport block is mapped to a first minimum scheduling time unit in the S minimum scheduling time units, a second retransmitted transport block is mapped to a second minimum scheduling time unit in the S minimum scheduling time units, and the initially transmitted transport block is mapped to a third minimum scheduling time unit and a fourth minimum scheduling time unit in the S minimum scheduling time units.

For another example, if T=4 and S=4, the T transport blocks may include one initially transmitted transport block and three retransmitted transport blocks, or the T transport blocks may include four retransmitted transport blocks. If the T transport blocks include one initially transmitted transport block and three retransmitted transport blocks, a first retransmitted transport block is mapped to a first minimum scheduling time unit in the S minimum scheduling time units, a second retransmitted transport block is mapped to a second minimum scheduling time unit in the S minimum scheduling time units, a third retransmitted transport block is mapped to a third minimum scheduling time unit in the S minimum scheduling time units, and the initially transmitted transport block is mapped to a fourth minimum scheduling time unit in the S minimum scheduling time units. If the T transport blocks include four retransmitted transport blocks, a first retransmitted transport block is mapped to a first minimum scheduling time unit in the S minimum scheduling time units, a second retransmitted transport block is mapped to a second minimum scheduling time unit in the S minimum scheduling time units, a third retransmitted transport block is mapped to a third minimum scheduling time unit in the S minimum scheduling time units, and a fourth retransmitted transport block is mapped to a fourth minimum scheduling time unit in the S minimum scheduling time units.

The network side device may use a field corresponding to each transport block to indicate an attribute of the transport block to the terminal device. The terminal device may determine the mapping relationship between a transport block and a minimum scheduling time unit based on the attribute of the transport block. Specifically, DCI may have T bits of NDI, and each bit is used to indicate whether a transport block is a retransmitted transport block. For example, when a bit value is 1 or 0, or when bit inverting occurs (this depends on a protocol, and in the following example, it is assumed that the bit value 1 represents initial transmission, and the bit value 0 represents retransmission), it indicates that a corresponding transport block is an initially transmitted transport block; otherwise, it indicates that a corresponding transport block is a retransmitted transport block. The terminal device may determine an attribute of each transport block based on the T bits, and determine, based on the attribute of each transport block, a minimum scheduling time unit to which each transport block is mapped.

For example, T=4, and T bits are 001x, where x represents that a value of the bit may be 1 or 0. After reading the T bits, the terminal device may determine that a first transport block and a second transport block in the four transport blocks are retransmitted transport blocks, and a third transport block is an initially transmitted transport block. In this case, the terminal device may determine that the first two minimum scheduling time units in the S minimum scheduling time units are minimum scheduling time units to which the two retransmitted transport blocks are mapped, and a remaining minimum scheduling time unit in the S minimum scheduling time units is a minimum scheduling time unit to which the initially transmitted transport block is mapped.

Figure 2:
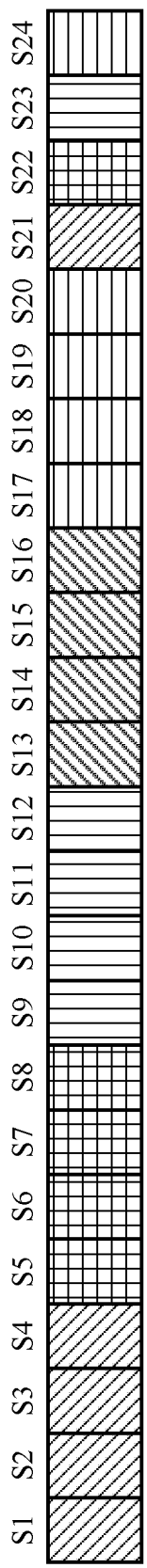
FIG. 2 is a schematic diagram of switching a scheduling rule in a transmission process.

FIG. 2 is a schematic diagram of switching a scheduling rule in a transmission process. FIG. 2 shows six consecutive times of scheduling. S1 to S24 shown in FIG. 2 represent 24 minimum scheduling time units. A quantity of minimum scheduling time units in one time of scheduling in FIG. 2 is 4. In the six consecutive times of scheduling, a transport block or a process in the first five times of scheduling is an initially transmitted transport block, and a quantity of transport blocks in each time of scheduling is 1, which is defined as the scheduling rule 1 in Table 1 (or the scheduling rule 4 in Table 2). Specifically, a process 0 is mapped to minimum scheduling time units S1 to S4, a process 1 is mapped to minimum scheduling time units S5 to S8, a process 2 is mapped to minimum scheduling time units S9 to S12, a process 3 is mapped to minimum scheduling time units S13 to S16, and a process 4 is mapped to minimum scheduling time units S17 to S20, where each of the process 0 to the process 4 is one initially transmitted transport block. After receiving a negative acknowledgement (non acknowledgment, NACK) indication sent by a receive end device, a transmit end device determines that a process or a transport block needs to be retransmitted. As shown in FIG. 2, four transport blocks are scheduled in a sixth time of scheduling, which is defined as the scheduling rule 3 in Table 1 (or the scheduling rule 1 in Table 2). The four transport blocks may be four retransmission processes (or referred to as retransmitted transport blocks), and data of the four retransmission processes is respectively mapped to four minimum scheduling time units. In other words, each process or transport block in the four retransmission processes in the sixth time of scheduling is mapped to only one minimum scheduling time unit. Certainly, in some other embodiments, the four transport blocks in the sixth time of scheduling may alternatively include a retransmitted transport block and an initially transmitted transport block. For example, one retransmitted transport block is mapped to a minimum scheduling time unit S21, and three initially transmitted transport blocks are respectively mapped to minimum scheduling time units S22 to S24. In some other embodiments, all the four transport blocks in the sixth time of scheduling may be initially transmitted transport blocks. In some other embodiments, there may be a retransmitted transport block in the first five times of scheduling. It should be noted that a quantity of minimum scheduling time units in each time of scheduling may dynamically change, and is not limited to 4.

Figure 3:
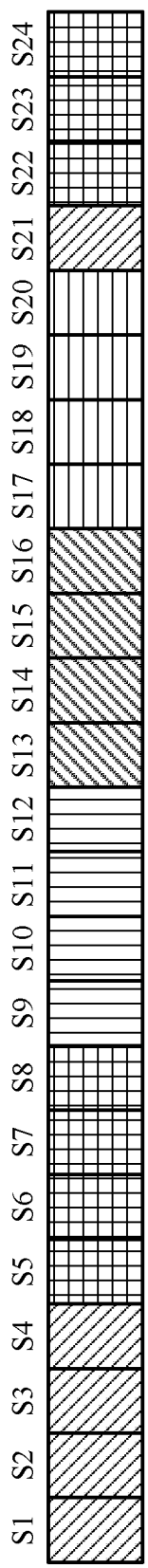
FIG. 3 is another schematic diagram of switching a scheduling rule in a transmission process.

FIG. 3 is another schematic diagram of switching a scheduling rule in a transmission process. FIG. 3 shows six consecutive times of scheduling. S1 to S24 shown in FIG. 3 represent 24 minimum scheduling time units. A quantity of minimum scheduling time units in one time of scheduling in FIG. 3 is 4. In the six consecutive times of scheduling, a transport block in the first five times of scheduling is an initially transmitted transport block, and a quantity of transport blocks in each time of scheduling is 1, which is defined as the scheduling rule 1 in Table 1 (or the scheduling rule 8 in Table 13). Specifically, a process 0 is mapped to minimum scheduling time units S1 to S4, a process 1 is mapped to minimum scheduling time units S5 to S8, a process 2 is mapped to minimum scheduling time units S9 to S12, a process 3 is mapped to minimum scheduling time units S13 to S16, and a process 4 is mapped to minimum scheduling time units S17 to S20, where each of the process 0 to the process 4 is one initially transmitted transport block. After receiving a NACK indication sent by a receive end device, a transmit end device determines that a process or a transport block needs to be retransmitted. In this case, two transport blocks are scheduled in a sixth time of scheduling, which is defined as the scheduling rule 3 in Table 13. The two transport blocks may be two retransmission processes (or referred to as retransmitted transport blocks). A first retransmission process in the two retransmission processes is mapped to a minimum scheduling time unit S21, and the other retransmission process is mapped to three minimum scheduling time units S22 to S24. Certainly, in some other embodiments, the two transport blocks in the sixth time of scheduling may alternatively include a retransmitted transport block and an initially transmitted transport block. For example, one retransmitted transport block is mapped to the minimum scheduling time unit S21, and one initially transmitted transport block is mapped to the minimum scheduling time units S22 to S24. In some other embodiments, both the two transport blocks in the sixth time of scheduling may be initially transmitted transport blocks. In some other embodiments, there may be a retransmitted transport block in the first five times of scheduling. It should be noted that a quantity of minimum scheduling time units in each time of scheduling may dynamically change, and is not limited to 4.

In some other embodiments, a mapping rule of a retransmitted transport block is: a quantity of minimum scheduling time units to which a retransmitted transport block may be mapped is greater than a quantity of minimum scheduling time units to which an initially transmitted transport block is mapped. In this way, a communication latency can be reduced, and communication reliability can be ensured, so that a transport block can be successfully decoded as soon as possible.

In some other embodiments, a mapping rule of a retransmitted transport block is: a quantity of minimum scheduling time units to which a retransmitted transport block may be mapped is equal to a quantity of minimum scheduling time units to which an initially transmitted transport block is mapped.

A network side device may support the foregoing three mapping rules of retransmitted transport blocks, and perform switching between two mapping rules as required. In the foregoing technical solution, the quantity of minimum scheduling time units to which a retransmitted transport block is mapped and the quantity of minimum scheduling time units to which an initially transmitted transport block is mapped may be adjusted as required, so that a performance gain can be obtained.

In all the foregoing embodiments, an example in which one minimum scheduling time unit carries data of no more than one transport block is used. In consideration of a 5G bandwidth (such as 80 MHz or more than 80 MHz) and a limitation on a sampling quantity (such as 2048) in fast Fourier transformation, in this application, data of a plurality of transport blocks may also be carried on one minimum scheduling time unit to implement high bandwidth communication. Data of one transport block may be carried on one or more subbands. Similarly, a plurality of transport blocks are scheduled by using one piece of DCI, so that signaling overheads can be reduced. For example, some domains may be shared by all transport blocks, and some domains may be specific to transport blocks. For example, an NDI domain may be a specific domain for each transport block. For another example, an MCS may be a value. For each transport block, an MCS value of the transport block is determined based on the MCS and a specific MCS offset value of the transport block. In view of the above, a quantity T of transport blocks in one time of scheduling may be greater than a quantity of minimum scheduling time units, thereby reducing control overheads.

Figure 4:
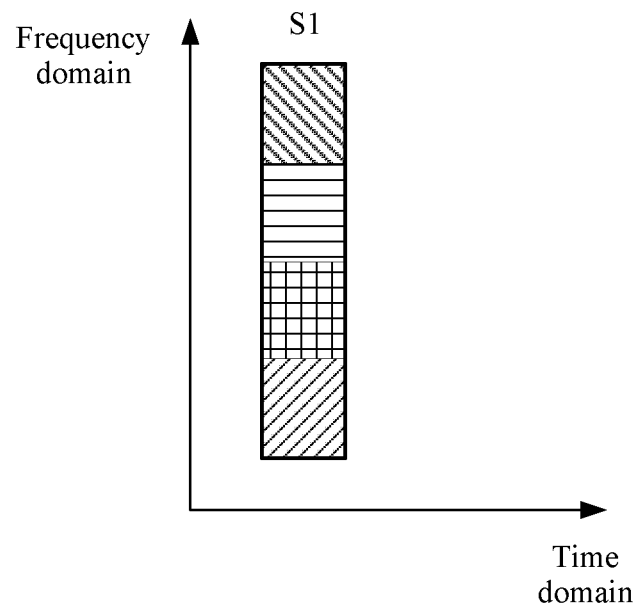
FIG. 4 is a schematic diagram in which a plurality of transport blocks in one time of scheduling are mapped to one minimum scheduling time unit.

FIG. 4 is a schematic diagram in which a plurality of transport blocks in one time of scheduling are mapped to one minimum scheduling time unit. As shown in FIG. 4, one minimum scheduling time unit S1 and four transport blocks are included in one time of scheduling. The four transport blocks in one time of scheduling are respectively mapped to four frequency domain resources of the minimum scheduling time unit in frequency domain. The four frequency domain resources may be consecutive or may be nonconsecutive, and the four frequency domain resources may have a same size or may have different sizes.

Figure 5:
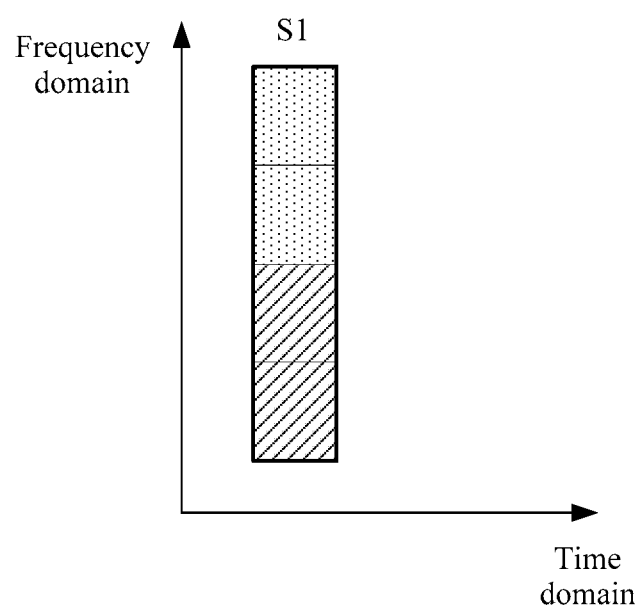
FIG. 5 is another schematic diagram in which a plurality of transport blocks in one time of scheduling are mapped to one minimum scheduling time unit.

FIG. 5 is another schematic diagram in which a plurality of transport blocks in one time of scheduling are mapped to one minimum scheduling time unit. As shown in FIG. 5, one minimum scheduling time unit S1 and two transport blocks are included in one time of scheduling. Each of the two transport blocks in one time of scheduling is mapped to two frequency domain resources of the minimum scheduling time unit in frequency domain. The four frequency domain resources may be consecutive or may be nonconsecutive, and the four frequency domain resources may have a same size or may have different sizes.

For ease of description, a case in which one minimum scheduling time unit carries data of no more than one transport block is referred to as time division multiplexing below, to be specific, all the foregoing embodiments are time division multiplexing scenarios. A case in which one minimum scheduling time unit carries data of two or more transport blocks is referred to as frequency division multiplexing. A specific embodiment of frequency division multiplexing is similar to the foregoing embodiment of time division multiplexing, and details are not described herein again.

Figure 6:
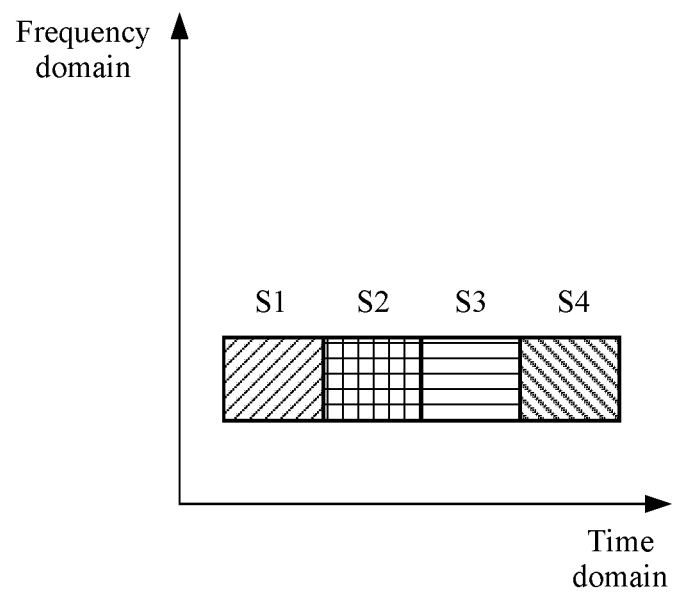
FIG. 6 is a schematic diagram in which a plurality of transport blocks in one time of scheduling are mapped to a plurality of minimum scheduling time units.
Figure 7:
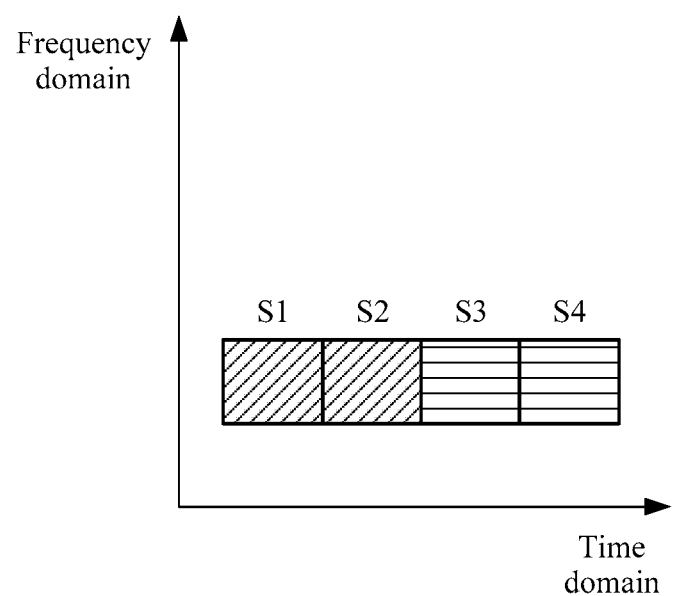
FIG. 7 is another schematic diagram in which a plurality of transport blocks in one time of scheduling are mapped to a plurality of minimum scheduling time units.

To facilitate understanding of a difference between frequency division multiplexing and time division multiplexing, the following describes time division multiplexing with reference to FIG. 6 and FIG. 7.

FIG. 6 is a schematic diagram in which a plurality of transport blocks in one time of scheduling are mapped to a plurality of minimum scheduling time units. As shown in FIG. 6, four minimum scheduling time units S1 to S4 and four transport blocks are included in one time of scheduling, and the four transport blocks are respectively mapped to the four minimum scheduling time units.

FIG. 7 is another schematic diagram in which a plurality of transport blocks in one time of scheduling are mapped to a plurality of minimum scheduling time units. As shown in FIG. 7, four minimum scheduling time units S1 to S4 and two transport blocks are included in one time of scheduling. The two transport blocks are mapped to the four minimum scheduling time units. Specifically, a first transport block in the two transport blocks is mapped to the minimum scheduling time units S1 and S2, and a second transport block in the two transport blocks is mapped to the minimum scheduling time units S3 and S4.

In some embodiments, time division multiplexing may be combined with frequency division multiplexing.

Figure 8:
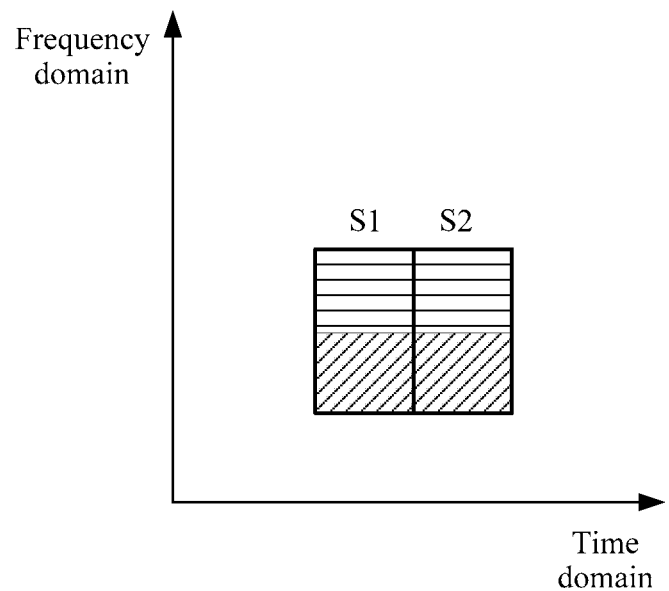
FIG. 8 is a schematic diagram of a combination of time division multiplexing and frequency division multiplexing.

FIG. 8 is a schematic diagram of a combination of time division multiplexing and frequency division multiplexing. As shown in FIG. 8, two minimum scheduling time units S1 and S2 and two transport blocks are included in one time of scheduling. The two transport blocks in one time of scheduling are separately mapped to different frequency domains of the two minimum scheduling time units. It may be learned that in the embodiment shown in FIG. 4, each of the two transport blocks in one time of scheduling is mapped to the two minimum scheduling time units in one time of scheduling.

Figure 9:
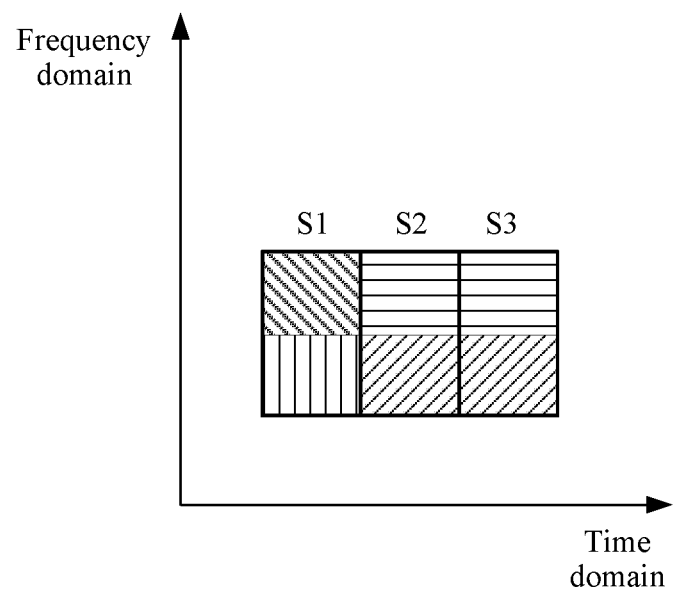
FIG. 9 is a schematic diagram of a combination of time division multiplexing and frequency division multiplexing.

FIG. 9 is a schematic diagram of a combination of time division multiplexing and frequency division multiplexing. As shown in FIG. 9, three minimum scheduling time units S1 to S3 and four transport blocks are included in one time of scheduling. A transport block 1 and a transport block 2 in the four transport blocks are separately mapped to different frequency domains of the minimum scheduling time unit S. A transport block 3 is mapped to the minimum scheduling time units S2 and S3, and a frequency domain resource of a minimum scheduling time unit to which the transport block 3 is mapped is the same as a frequency domain resource of a minimum scheduling time unit to which the transport block 1 is mapped. Similarly, a transport block 4 is mapped to the minimum scheduling time units S2 and S3, and a frequency domain resource of a minimum scheduling time unit to which the transport block 4 is mapped is the same as a frequency domain resource of a minimum scheduling time unit to which the transport block 2 is mapped. In addition, the two minimum scheduling time units to which the transport block 3 is mapped are the same as the two minimum scheduling time units to which the transport block 4 is mapped. Frequency domain resources of the two minimum scheduling time units to which the transport block 3 is mapped are different from frequency domain resources of the two minimum scheduling time units to which the transport block 4 is mapped.

In addition, in the combination of frequency division multiplexing and time division multiplexing, a mapping relationship between T transport blocks and S minimum scheduling time units in one time of scheduling on each frequency domain resource is the same as a mapping relationship between T transport blocks and a minimum scheduling time unit in one time of scheduling in a time division multiplexing scenario, and details are not described herein.

In some other embodiments, a time division multiplexing manner may be used for an initially transmitted transport block, and a frequency division multiplexing manner may be used for a retransmitted transport block.

Figure 10:
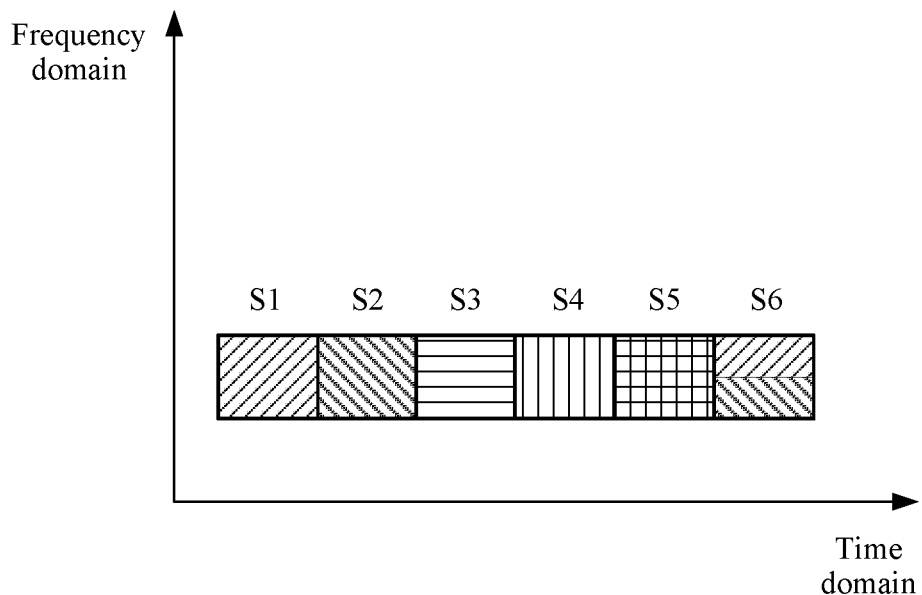
FIG. 10 is a schematic diagram of transmitting an initially transmitted transport block and a retransmitted transport block through frequency division multiplexing.

FIG. 10 is a schematic diagram of transmitting an initially transmitted transport block and a retransmitted transport block through frequency division multiplexing. S1 to S6 shown in FIG. 10 represent six minimum scheduling time units. As shown in FIG. 10, in six consecutive times of scheduling, a transport block in the first five times of scheduling is an initially transmitted transport block, and each transport block is mapped to one minimum scheduling time unit, which may be defined as a scheduling rule 1. In some embodiments, a process 0 is mapped to a minimum scheduling time unit S1, a process 1 is mapped to a minimum scheduling time unit S2, a process 2 is mapped to a minimum scheduling time unit S3, a process 3 is mapped to a minimum scheduling time unit S4, and a process 4 is mapped to a minimum scheduling time unit S5, where each of the process 0 to the process 4 is one initially transmitted transport block. After receiving a NACK indication sent by a receive end device, a transmit end device determines that a process or a transport block needs to be retransmitted. In this case, two transport blocks may be scheduled in a sixth time of scheduling, which may be defined as a scheduling rule 2. The two transport blocks may include retransmission processes (or referred to as retransmitted transport blocks), and the two retransmission processes are mapped to a minimum scheduling time unit S6 in a frequency division multiplexing manner. Certainly, in some other embodiments, the two transport blocks included in the sixth time of scheduling may be a retransmitted transport block and an initially transmitted transport block. The retransmitted transport block and the initially transmitted transport block are mapped to the minimum scheduling time unit S6 in a frequency division multiplexing manner. Alternatively, both the two transport blocks are initially transmitted transport blocks. In some other embodiments, there may be a retransmitted transport block in the first five times of scheduling. It should be noted that a quantity of minimum scheduling time units in each time of scheduling may dynamically change, and is not limited to 1.

For ease of description, in the embodiments in FIG. 2 to FIG. 10, only a resource occupied by a transport block is shown, but a resource occupied by a control signal is not shown.

It should be noted that a non-spatial multiplexing scenario is considered in all the embodiments of this specification, to be specific, a quantity of transport blocks in one time of scheduling is for a configuration scenario in which only data of one code word or one transport block is carried on one time-frequency resource. In this scenario, a plurality of transport blocks in one time of scheduling may be mapped to a plurality of minimum scheduling time units in a time division multiplexing manner, or a plurality of transport blocks in one time of scheduling may be mapped to one minimum scheduling time unit in a frequency division multiplexing manner.

In addition, all the foregoing embodiments are embodiments in which a transmission mode determined by a network side device is a non-spatial multiplexing transmission mode. In other words, the mapping relationship between T transport blocks and S minimum scheduling time units in one time of scheduling, the quantity of transport blocks in one time of scheduling, and the like in the foregoing embodiments are all for the non-spatial multiplexing scenario. The non-spatial multiplexing transmission mode is a transmission mode in which only data of one code word or one transport block is carried on one time-frequency resource.

When the transmission mode determined by the network side device is a spatial multiplexing transmission mode, it is assumed that data of $N_c$ code words or $N_c$ transport blocks is carried on one time-frequency resource, where $N_c$ is a positive integer greater than or equal to 2 (herein, the transmission mode scenario is referred to as a scenario of $N_c$ code words or $N_c$ streams in this application, where $N_c$ is a quantity of code words, a quantity of processes, or a quantity of transport blocks in spatial multiplexing on one time-frequency resource). In this case, a total quantity of transport blocks in one time of scheduling is $N_c \times T$, and a quantity of transport blocks in each of the $N_c$ code words or each of the $N_c$ streams in one time of scheduling is T. Similarly, a quantity of minimum scheduling time units in one time of scheduling in this scenario is S.

In the foregoing spatial multiplexing scenario, a mapping relationship between $N_c \times T$ transport blocks and S minimum scheduling time units in one time of scheduling is a mapping relationship between T transport blocks in each of the $N_c$ code words or each of the $N_c$ streams and S minimum scheduling time units in one time of scheduling. The mapping relationship between T transport blocks in each code word or each stream and S minimum scheduling time units in one time of scheduling is the same as the mapping relationship between T transport blocks and S minimum scheduling time units in one time of scheduling in the non-spatial multiplexing scenario. In other words, the mapping relationship between T transport blocks and S minimum scheduling time units in one time of scheduling in the non-spatial multiplexing scenario is the mapping relationship between T transport blocks in each code word or each stream and S minimum scheduling time units in one time of scheduling in the spatial multiplexing scenario. The quantity T of transport blocks in one time of scheduling in the non-spatial multiplexing scenario is the quantity T of transport blocks in each code word or each stream in one time of scheduling in the spatial multiplexing scenario. Therefore, for a specific embodiment of the mapping relationship between T transport blocks in each code word or each stream and S minimum scheduling time units in one time of scheduling, refer to the specific embodiment of the mapping relationship between T transport blocks and S minimum scheduling time units in one time of scheduling in the non-spatial multiplexing scenario in all the foregoing embodiments. Details are not described herein again.

In addition, mapping relationships between T transport blocks in any two code words or any two streams and S minimum scheduling time units in one time of scheduling are the same in the spatial multiplexing scenario.

A method for determining a target scheduling rule and a method for indicating a target scheduling rule in the spatial multiplexing scenario are the same as those in the non-spatial multiplexing scenario. For details, refer to the foregoing embodiment. Details are not described herein again.

In addition, in some embodiments, DCI sent by the network side device to the terminal device includes a transport block process domain, and the transport block process domain is used to indicate a process number of each transport block in the T transport blocks. A length of the transport block process domain is w bits, the w bits may indicate $T \times 2^w$ process numbers, and T represents a quantity of transport blocks in one time of scheduling.

For example, when one transport block is mapped to one minimum scheduling time unit, it is assumed that there are four minimum scheduling time units in one time of scheduling, and a feedback processing latency is also four minimum scheduling time units. In this case, eight processes are required. The DCI may include a one-bit transport block process domain. The terminal device may determine a process number in the following manner:

$$P\_Num = i \times T + j \qquad \text{(formula 1.1)}$$

P_Num represents the process number, i represents a value of the transport block process domain, T represents the quantity of transport blocks in one time of scheduling, j=1, . . . , or T, i=0 in a first time of scheduling, and i=1 in a second time of scheduling. In this way, the terminal device may determine a process number of each transport block in each time of scheduling by using the formula 1.1. In the foregoing technical solution, when the eight processes need to be indicated, a length of an indication field that is used to indicate a process number may be shortened from 3 bits to 1 bit, so that DCI overheads can be reduced.

The foregoing embodiments are merely intended to help a person skilled in the art understand the technical solutions in the embodiments of this application better, but are not intended to limit the technical solutions in the embodiments of this application. In one implementation, a quantity of processes, a frame format, a quantity of minimum scheduling time units in one time of scheduling, a quantity of resources required by a retransmitted transport block and a quantity of resources required by an initially transmitted transport block, whether frequency domain resources are consecutive, a quantity of frequency domain resources in each time of scheduling, a quantity of layers, a quantity of code words, a quantity of layers to which a code word is mapped, a quantity of streams, an antenna configuration, a transmission mode, and the like may change. This is not limited in this specification.

Further, the scenario discussed in the foregoing embodiments is a scenario in which the network side device communicates with the terminal device. The foregoing technical solutions may be further applied to device-to-device (device-to-device, D2D) communication.

The D2D communication includes D2D communication that is controlled by the network side device (which is referred to as first-type D2D communication below) and D2D communication that is not controlled by the network side device (which is referred to as second-type D2D communication below).

In a first-type D2D communication scenario, the network side device may be responsible for determining a target scheduling rule from N scheduling rules, and indicating the target scheduling rule to a terminal device that performs D2D communication. In the first-type D2D communication scenario, a manner of determining the target scheduling rule by the network side device is the same as a manner of determining the target scheduling rule by the network side device in the scenario in which the network side device communicates with the terminal device. In the first-type D2D communication scenario, a manner of indicating the target scheduling rule by the network side device is the same as a manner of indicating the target scheduling rule by the network side device in the scenario in which the network side device communicates with the terminal device. Details are not described herein again. The terminal device that performs D2D communication may perform communication according to the target scheduling rule indicated by the network side device.

In a second-type D2D communication scenario, a terminal device that performs D2D communication may include one primary terminal device. The primary terminal device is responsible for determining a target scheduling rule from the N scheduling rules, and indicating the target scheduling rule to another device that performs D2D communication. In the second-type D2D communication scenario, a manner of determining the target scheduling rule by the primary terminal device is the same as a manner of determining the target scheduling rule by the network side device in the scenario in which the network side device communicates with the terminal device. In the second-type D2D communication scenario, a manner of indicating the target scheduling rule by the primary terminal device is the same as a manner of indicating the target scheduling rule by the network side device in the scenario in which the network side device communicates with the terminal device. Details are not described herein again. The terminal device that performs D2D communication may perform communication according to the target scheduling rule indicated by the primary terminal device.

Figure 11:
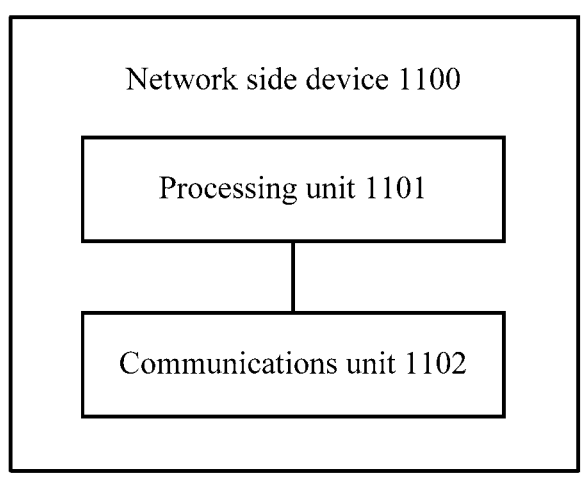
FIG. 11 is a structural block diagram of a network side device according to an embodiment of this application.

FIG. 11 is a structural block diagram of a network side device according to an embodiment of this application. As shown in FIG. 11, a network side device 1100 includes a processing unit 1101 and a communications unit 1102.

The processing unit 1101 is configured to: when a quantity of minimum scheduling time units in one time of scheduling performed by the network side device 1100 is S, and the network side device 1100 and a terminal device transmit data in a first transmission mode, determine a target scheduling rule from N scheduling rules, where the scheduling rule includes at least one of a quantity T of transport blocks in one time of scheduling and a mapping relationship between T transport blocks and S minimum scheduling time units in one time of scheduling, N is an integer greater than or equal to 2, T is an integer greater than or equal to 1, S is an integer greater than or equal to 1, and the first transmission mode is a single-antenna transmission scheme or a multi-antenna transmission scheme.

The communications unit 1102 is configured to communicate with the terminal device according to the target scheduling rule.

For operations and functions of the processing unit 1101 and the communications unit 1102 of the network side device 1100, refer to the descriptions in the foregoing method. To avoid repetition, details are not described herein again.

The processing unit 1101 may be implemented by a processor, and the communications unit 1102 may be implemented by a transceiver.

Figure 12:
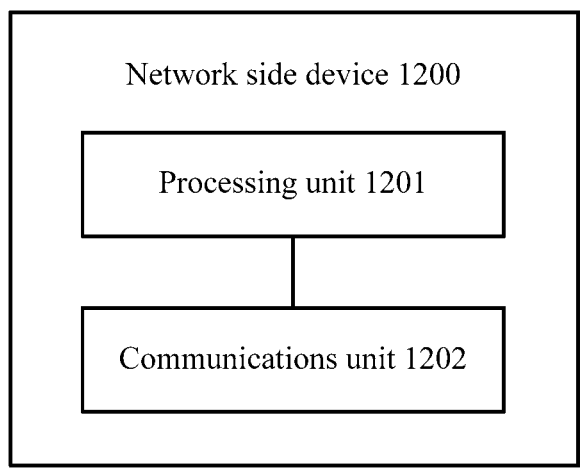
FIG. 12 is a structural block diagram of a terminal device according to an embodiment of this application.

FIG. 12 is a structural block diagram of a terminal device according to an embodiment of this application. As shown in FIG. 12, a terminal device 1200 includes a processing unit 1201 and a communications unit 1202.

The processing unit 1201 is configured to: when the terminal device and a network side device 1200 transmit data in a first transmission mode, and a quantity of minimum scheduling time units in one time of scheduling performed by the network side device is S, determine, by the terminal device, a target scheduling rule, where the target scheduling rule is one of N scheduling rules, the scheduling rule includes at least one of a quantity T of transport blocks in one time of scheduling and a mapping relationship between T transport blocks and S minimum scheduling time units in one time of scheduling, N is a positive integer greater than or equal to 2, T is a positive integer greater than or equal to 1, S is a positive integer greater than or equal to 1, and the first transmission mode is a single-antenna transmission scheme or a multi-antenna transmission scheme.

The communications unit 1202 is configured to communicate with the network side device according to the target scheduling rule.

For operations and functions of the processing unit 1201 and the communications unit 1202 of the terminal device 1200, refer to the descriptions in the foregoing method. To avoid repetition, details are not described herein again.

The processing unit 1201 may be implemented by a processor, and the communications unit 1202 may be implemented by a transceiver.

Figure 13:
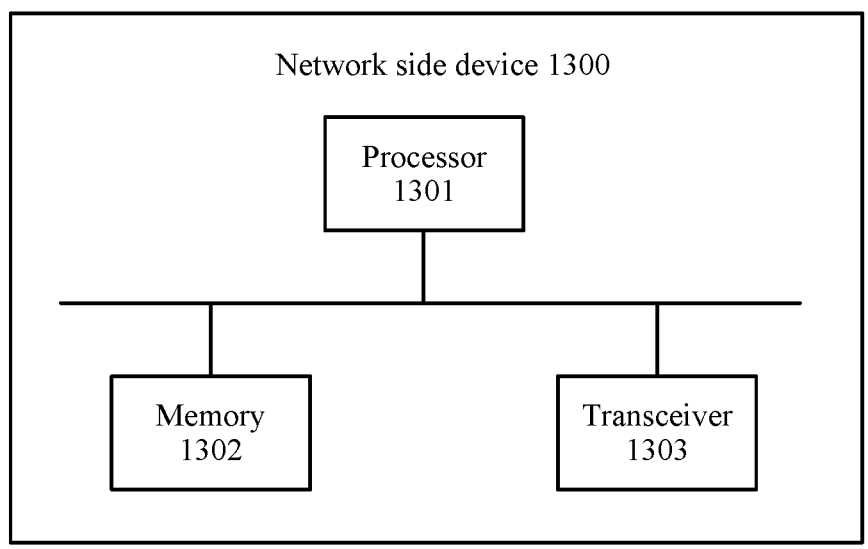
FIG. 13 is a structural block diagram of a network side device according to an embodiment of this application.

FIG. 13 is a structural block diagram of a network side device according to an embodiment of this application. As shown in FIG. 13, a network side device 1300 includes a processor 1301, a memory 1302, and a transceiver 1303.

The components in the network side device 1300 communicate with each other by using an internal connection path, to transmit a control signal and/or a data signal.

The methods disclosed in the embodiments of this application may be applied to the processor 1301, or may be implemented by the processor 1301. The processor 1301 may be an integrated circuit chip and has a signal processing capability. In an implementation process, steps of the foregoing methods may be completed by using an integrated logic circuit of hardware in the processor 1301 or an instruction in a form of software. The processor 1301 may be a general purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a discrete gate, a transistor logic device, or a discrete hardware component. The processor 1301 may implement or perform the methods, the steps, and the logical block diagrams that are disclosed in the embodiments of this application. The general purpose processor may be a microprocessor, or the processor may be any conventional processor or the like. The steps of the methods disclosed with reference to the embodiments of this application may be directly performed and completed through a hardware decoding processor, or may be performed and completed by using a combination of hardware in a decoding processor and a software module. The software module may be located in a mature storage medium in the art, such as a random access memory (Random Access Memory, RAM), a flash memory, a read-only memory (Read-Only Memory, ROM), a programmable read-only memory, an electrically-erasable programmable memory, or a register. The storage medium is located in the memory 1302. The processor 1301 reads an instruction in the memory 1302 and completes, in combination with hardware in the transceiver 1303, each step performed by the network side device in the foregoing method.

It may be understood that, in addition to the processor 1301, the memory 1302, and the transceiver 1303 shown in FIG. 13, the network side device 1300 includes some necessary apparatuses such as an antenna, a cyclic prefix remover, and a fast Fourier transformation processor. To avoid redundancy, the foregoing apparatuses are not shown in FIG. 13.

Figure 14:
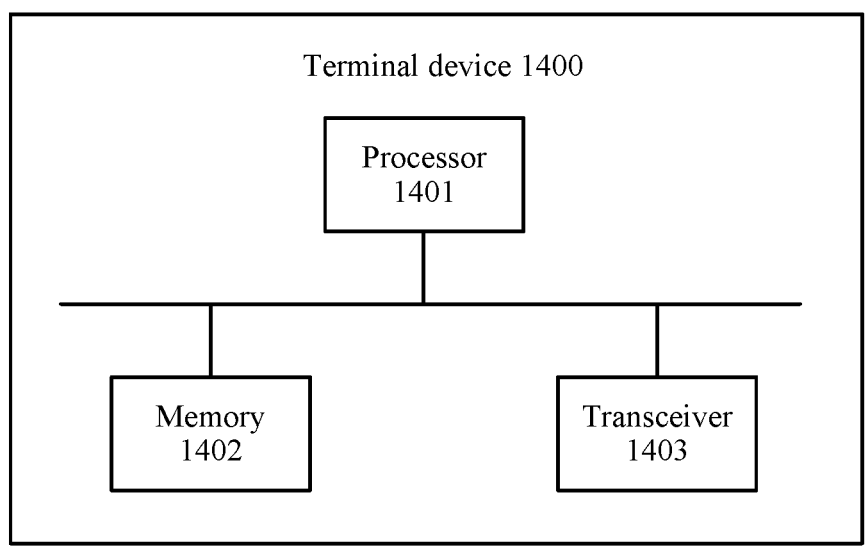
FIG. 14 is a structural block diagram of a terminal device according to an embodiment of this application.

FIG. 14 is a structural block diagram of a terminal device according to an embodiment of this application. As shown in FIG. 14, a terminal device 1400 includes a processor 1401, a memory 1402, and a transceiver 1403.

The components in the terminal device 1400 communicate with each other by using an internal connection path, to transmit a control signal and/or a data signal.

The methods disclosed in the embodiments of this application may be applied to the processor 1401, or may be implemented by the processor 1401. The processor 1401 may be an integrated circuit chip and has a signal processing capability. In an implementation process, steps of the foregoing methods may be completed by using an integrated logic circuit of hardware in the processor 1401 or an instruction in a form of software. The processor 1401 may be a general purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a discrete gate, a transistor logic device, or a discrete hardware component. The processor 1401 may implement or perform the methods, the steps, and the logical block diagrams that are disclosed in the embodiments of this application. The general purpose processor may be a microprocessor, or the processor may be any conventional processor or the like. The steps of the methods disclosed with reference to the embodiments of this application may be directly performed and completed through a hardware decoding processor, or may be performed and completed by using a combination of hardware in a decoding processor and a software module. The software module may be located in a mature storage medium in the art, such as a random access memory (Random Access Memory, RAM), a flash memory, a read-only memory (Read-Only Memory, ROM), a programmable read-only memory, an electrically-erasable programmable memory, or a register. The storage medium is located in the memory 1402. The processor 1401 reads an instruction in the memory 1402 and completes, in combination with hardware in the transceiver 1403, each step performed by the terminal device in the foregoing method.

It may be understood that, in addition to the processor 1401, the memory 1402, and the transceiver 1403 shown in FIG. 14, the terminal device 1400 includes some necessary apparatuses such as an antenna, a display, and an input apparatus. To avoid redundancy, the foregoing apparatuses are not shown in FIG. 14.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network side device, or the like) to perform all or some of the steps of the methods in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
    when a quantity of minimum scheduling time units in one time of scheduling performed by a network side device is S, and the network side device and a terminal device transmit data in a first transmission mode, determining, by the network side device, a target scheduling rule from N scheduling rules, wherein the target scheduling rule comprises at least one of a quantity T of transport blocks in one time of scheduling and a mapping relationship between the T transport blocks and S minimum scheduling time units in the one time of scheduling, wherein N is an integer greater than or equal to 2, T is an integer greater than or equal to 1, S is an integer greater than or equal to 1, and the first transmission mode is a single-antenna transmission scheme or a multi-antenna transmission scheme; and
    communicating, by the network side device, with the terminal device according to the target scheduling rule; and, wherein determining, by the network side device, the target scheduling rule from N scheduling rules comprises:
    determining, by the network side device, based on a correspondence between parameter information and a scheduling rule, the scheduling rule as the target scheduling rule, wherein the parameter information comprises at least one of a subcarrier spacing used when the network side device communicates with the terminal device and a quantity of symbols occupied by a minimum scheduling time unit that are used when the network side device communicates with the communications device.

2. The method according to claim 1, wherein the mapping relationship between T transport blocks and S minimum scheduling time units in one time of scheduling is:
    each of the T transport blocks is mapped to one of the S minimum scheduling time units;
    each of the T transport blocks is mapped to the S minimum scheduling time units; or
    each of the T transport blocks is mapped to St consecutive minimum scheduling time units in the S minimum scheduling time units, wherein $S=S_t \times T$, and $S_t$ is an integer greater than 1 and less than S.

3. The method according to claim 1, wherein the mapping relationship between T transport blocks and S minimum scheduling time units in one time of scheduling is:
    a first transport block in the T transport blocks is mapped to a+b minimum scheduling time units, and each of the T transport blocks except the first transport block is mapped to a minimum scheduling time units, wherein both a and b are positive integers, b is less than T, and $S=a \times T+b$; or
    a $T^{th}$ transport block in the T transport blocks is mapped to a+b minimum scheduling time units, and each of the T transport blocks except the $T^{th}$ transport block is mapped to a minimum scheduling time units, wherein both a and b are positive integers, b is less than T, and $S=a \times T+b$.

4. The method according to claim 1, wherein before communicating, by the network side device, with the terminal device according to the target scheduling rule, the method further comprises:
    sending, by the network side device, target scheduling rule indication information to the terminal device, wherein the target scheduling rule indication information indicates the target scheduling rule determined by the network side device.

5. The method according to claim 4, wherein the target scheduling rule indication information is carried in control signaling.

6. The method according to claim 4, wherein the target scheduling rule indication information comprises at least one of the following: a subcarrier spacing, a quantity of symbols occupied by a minimum scheduling time unit, a downlink control information format, a modulation and coding scheme, a cyclic redundancy check code, and a quantity of allocated resource blocks.

7. A communication method, wherein the method comprises:
    when a terminal device and a network side device transmit data in a first transmission mode, and a quantity of minimum scheduling time units in one time of scheduling performed by the network side device is S, determining, by the terminal device, a target scheduling rule, wherein the target scheduling rule is one of N scheduling rules, the scheduling rule comprises at least one of a quantity T of transport blocks in one time of scheduling and a mapping relationship between T transport blocks and S minimum scheduling time units in one time of scheduling, wherein N is a positive integer greater than or equal to 2, T is a positive integer greater than or equal to 1, S is a positive integer greater than or equal to 1, and the first transmission mode is a single-antenna transmission scheme or a multi-antenna transmission scheme; and
    communicating, by the terminal device, with the network side device according to the target scheduling rule; and, wherein determining, by the terminal device, the target scheduling rule comprises:
    determining, by the terminal device, that the target scheduling rule is a scheduling rule corresponding to parameter information used when the terminal device communicates with the network side device, wherein the parameter information comprises at least one of a subcarrier spacing used when the network side device communicates with the terminal device and a quantity of symbols occupied by each minimum scheduling time unit.

8. The method according to claim 7, wherein the mapping relationship between T transport blocks and S minimum scheduling time units in one time of scheduling is:
    each of the T transport blocks is mapped to one of the S minimum scheduling time units;
    each of the T transport blocks is mapped to the S minimum scheduling time units; or
    each of the T transport blocks is mapped to $S_t$ consecutive minimum scheduling time units in the S minimum scheduling time units, wherein $S=S_t \times T$, and $S_t$ is an integer greater than 1 and less than S.

9. The method according to claim 7, wherein the mapping relationship between T transport blocks and S minimum scheduling time units in one time of scheduling is:

a first transport block in the T transport blocks is mapped to a+b minimum scheduling time units, and each of the T transport blocks except the first transport block is mapped to a minimum scheduling time units, wherein both a and b are positive integers, b is less than T, and S=a×T+b; or a $T^{th}$ transport block in the T transport blocks is mapped to a+b minimum scheduling time units, and each of the T transport blocks except the $T^{th}$ transport block is mapped to a minimum scheduling time units, wherein both a and b are positive integers, b is less than T, and S=a×T+b.

10. The method according to claim 7, wherein determining, by the terminal device, the target scheduling rule comprises:

obtaining, by the terminal device, target scheduling rule indication information sent by the network side device, wherein the target scheduling rule indication information indicates a scheduling rule determined by the network side device; and determining, by the terminal device, the target scheduling rule as the scheduling rule indicated by the target scheduling rule indication information.

11. The method according to claim 10, wherein the target scheduling rule indication information comprises at least one of the following: a subcarrier spacing, a quantity of symbols occupied by a minimum scheduling time unit, a downlink control information format, a modulation and coding scheme, a cyclic redundancy check code, or a quantity of allocated resource blocks.

12. The method according to claim 11, wherein determining, by the terminal device, the target scheduling rule as the scheduling rule indicated by the target scheduling rule indication information comprises:

determining, by the terminal device based on a correspondence between target scheduling rule indication information and a scheduling rule, the scheduling rule corresponding to the target scheduling rule indication information in the N scheduling rules as the target scheduling rule.

13. The method according to claim 10, wherein obtaining, by the terminal device, target scheduling rule indication information sent by the network side device comprises:

obtaining, by the terminal device, the target scheduling rule indication information from received control signaling sent by the network side device.

14. A network side device, wherein a quantity of minimum scheduling time units in one time of scheduling performed by the network side device is S, the network side device and a terminal device transmit data in a first transmission mode, and the network side device comprises:

a processing unit, configured to determine a target scheduling rule from N scheduling rules, wherein the target scheduling rule comprises at least one of a quantity T of transport blocks in one time of scheduling and a mapping relationship between T transport blocks and S minimum scheduling time units in one time of scheduling, wherein N is a positive integer greater than or equal to 2, T is a positive integer greater than or equal to 1, S is a positive integer greater than or equal to 1, and the first transmission mode is a single-antenna transmission scheme or a multi-antenna transmission scheme; and a communications unit, configured to communicate with the terminal device according to the target scheduling rule; and, wherein the processing unit is configured to:

determine, by the network side device based on a correspondence between parameter information and a scheduling rule, the scheduling rule as the target scheduling rule, wherein the parameter information comprises at least one of a subcarrier spacing used when the network side device communicates with the terminal device and a quantity of symbols occupied by a minimum scheduling time unit that are used when the network side device communicates with the communications device.

15. The network side device according to claim 14, wherein the mapping relationship between T transport blocks and S minimum scheduling time units in one time of scheduling is:

each of the T transport blocks is mapped to one of the S minimum scheduling time units;

each of the T transport blocks is mapped to the S minimum scheduling time units; or each of the T transport blocks is mapped to St consecutive minimum scheduling time units in the S minimum scheduling time units, wherein S=$S_t$×T, and $S_t$ is an integer greater than 1 and less than S.

16. The network side device according to claim 14, wherein the mapping relationship between T transport blocks and S minimum scheduling time units in one time of scheduling is:

a first transport block in the T transport blocks is mapped to a+b minimum scheduling time units, and each of the T transport blocks except the first transport block is mapped to a minimum scheduling time units, wherein both a and b are positive integers, b is less than T, and S=a×T+b; or a $T^{th}$ transport block in the T transport blocks is mapped to a+b minimum scheduling time units, and each of the T transport blocks except the $T^{th}$ transport block is mapped to a minimum scheduling time units, wherein both a and b are positive integers, b is less than T, and S=a×T+b.

17. The network side device according to claim 14, wherein the communications unit is further configured to send target scheduling rule indication information to the terminal device, wherein the target scheduling rule indication information is used to indicate the target scheduling rule determined by the network side device.

* * * * *